(12) United States Patent
Coughlin et al.

(10) Patent No.: US 10,688,951 B2
(45) Date of Patent: Jun. 23, 2020

(54) SYSTEM AND METHOD FOR DETERMINING WHETHER A SEATBELT IS USED INCORRECTLY, AND FOR TAKING CORRECTIVE ACTION WHEN THE SEATBELT IS USED INCORRECTLY

(71) Applicant: GM Global Technology Operations LLC, Detroit, MI (US)

(72) Inventors: Sean T. Coughlin, Shelby Township, MI (US); Carolyn M. Mavis, Washington, MI (US); Scott D. Thomas, Novi, MI (US); Orhan Demirovic, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 15/821,516

(22) Filed: Nov. 22, 2017

(65) Prior Publication Data
US 2019/0152418 A1    May 23, 2019

(51) Int. Cl.
*B60R 21/015*    (2006.01)
*B60N 2/02*    (2006.01)
(Continued)

(52) U.S. Cl.
CPC ........ *B60R 21/01548* (2014.10); *B60K 28/02* (2013.01); *B60N 2/0252* (2013.01);
(Continued)

(58) Field of Classification Search
CPC ........ B60R 21/01544; B60R 21/01546; B60R 21/01548; B60R 21/01554;
(Continued)

(56) References Cited

U.S. PATENT DOCUMENTS 3,815,086 A * 6/1974 Minton ................... B60R 22/48
                                                    180/270
4,730,844 A * 3/1988 Patterson ................ B60R 22/06
                                                    280/804

(Continued)

OTHER PUBLICATIONS

U.S. Appl. No. 15/727,964, filed Oct. 9, 2017, Kleinert et al.

*Primary Examiner* — Thomas G Black
*Assistant Examiner* — Sara J Lewandroski
(74) *Attorney, Agent, or Firm* — Harness, Dickey & Pierce, P.L.C.

(57) ABSTRACT

A system includes a first webbing payout sensor and a seatbelt wear condition module. The first webbing payout sensor can detect a first webbing payout of a seatbelt associated with a seat of a vehicle. The first webbing payout is a first length of webbing of the seatbelt dispensed from a first retractor of the seatbelt. The seatbelt wear condition module can identify whether the seatbelt is worn correctly based on the first webbing payout. The system may further include a second webbing payout sensor that detects a second webbing payout of the seatbelt associated with the seat. The second webbing payout is a second length of webbing of the seatbelt dispensed from a second retractor of the seatbelt. The seatbelt wear condition module identifies whether the seatbelt is worn correctly based on the first webbing payout and the second webbing payout.

14 Claims, 13 Drawing Sheets

(51) Int. Cl.
*B60K 28/02* (2006.01)
*B60R 22/48* (2006.01)
*B60R 21/01* (2006.01)

(52) U.S. Cl.
CPC ........ *B60R 21/01566* (2014.10); *B60R 22/48* (2013.01); *B60N 2002/0268* (2013.01); *B60R 2021/01286* (2013.01); *B60R 2022/4825* (2013.01)

(58) Field of Classification Search
CPC .............. B60R 21/01566; B60R 22/48; B60R 2022/4808; B60R 2022/4816; B60R 2022/4825; B60R 2022/4833; B60R 2022/485; B60R 2022/4891; B60K 28/00; B60K 28/02; B60K 28/10
See application file for complete search history.

(56) References Cited

U.S. PATENT DOCUMENTS

| | | | | |
|---|---|---|---|---|
| 5,558,293 | A * | 9/1996 | Hirase | B60R 22/44 242/372 |
| 6,362,734 | B1 * | 3/2002 | McQuade | B60R 22/48 180/267 |
| 9,415,746 | B1 * | 8/2016 | Johnson | B60R 22/44 |
| 9,878,689 | B1 * | 1/2018 | Jimenez | B60R 22/48 |
| 2004/0113409 | A1 * | 6/2004 | Ingemarsson | B60R 22/341 280/806 |
| 2009/0112408 | A1 * | 4/2009 | Kankanala | B60R 22/48 701/45 |
| 2015/0096819 | A1 * | 4/2015 | Grajkowski | B60K 26/04 180/170 |
| 2015/0251618 | A1 * | 9/2015 | Ghannam | B60R 21/01544 340/457.1 |
| 2016/0046261 | A1 * | 2/2016 | Gulash | B60R 22/48 701/23 |
| 2016/0159320 | A1 * | 6/2016 | Andreen | G06K 9/4633 382/103 |
| 2018/0170296 | A1 * | 6/2018 | Pline | B60R 21/23 |
| 2019/0061683 | A1 * | 2/2019 | Jessup | B60R 22/48 |

* cited by examiner

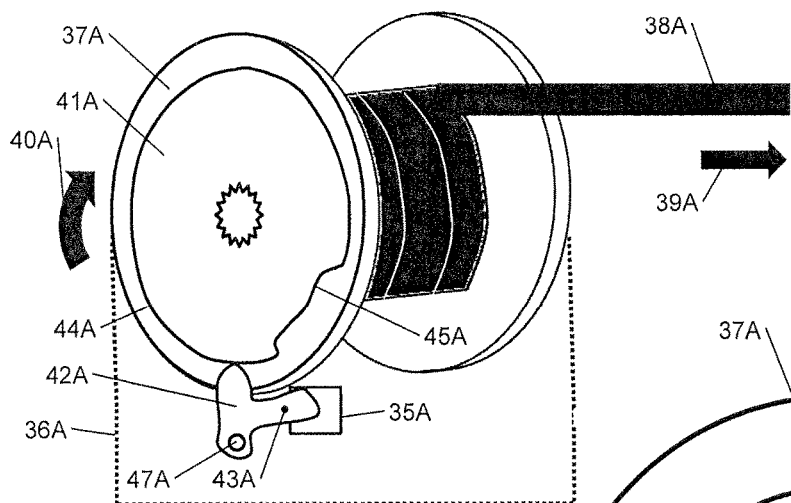
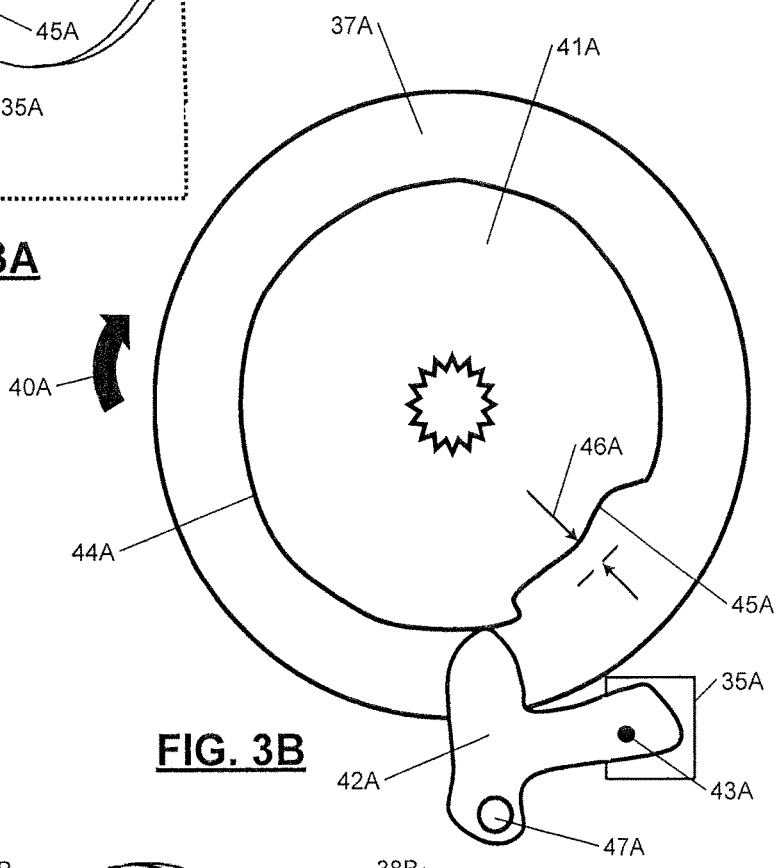
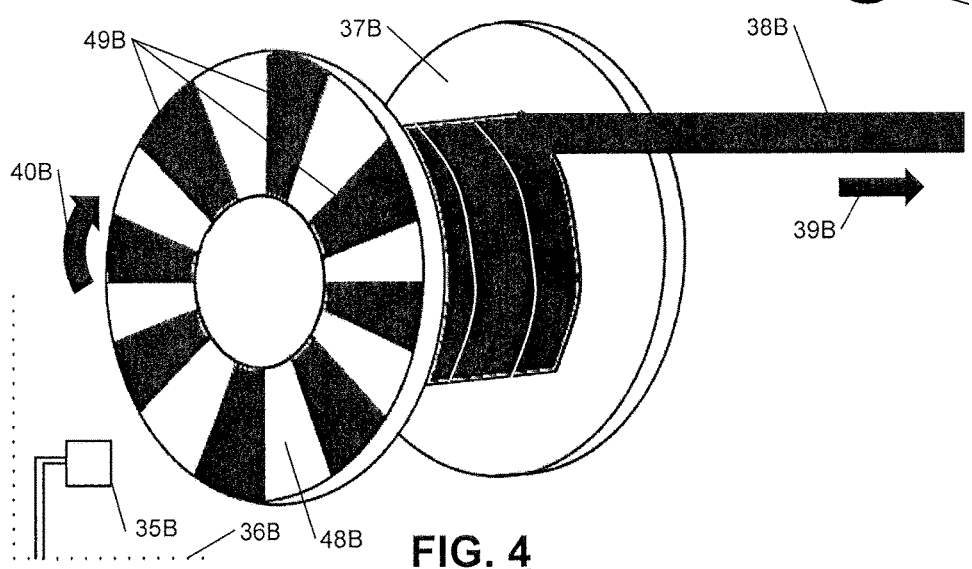

SYSTEM AND METHOD FOR DETERMINING WHETHER A SEATBELT IS USED INCORRECTLY, AND FOR TAKING CORRECTIVE ACTION WHEN THE SEATBELT IS USED INCORRECTLY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for determining whether a seatbelt is used incorrectly, and for taking corrective action when the seatbelt is used incorrectly.

A seatbelt assembly in a vehicle, which may be an autonomous vehicle, typically includes seatbelt webbing attached to a tongue or latch plate, a seatbelt buckle, and a retractor. The seatbelt may include both lap webbing and shoulder webbing. When the seatbelt is buckled, the lap webbing extends from a first side of a vehicle seat to a buckle on a second side of the seat. The shoulder webbing extends diagonally from over an occupant's shoulder on the first side of the seat to the buckle on the second side of the seat.

The retractor includes a spool for dispensing and retracting the seatbelt webbing. An occupant may pull the seatbelt webbing to extract a desired length of seatbelt webbing from the retractor. The occupant can insert the tongue into the buckle to secure the seatbelt webbing around the occupant. The occupant may press a button on the buckle to release the tongue and allow the spool to retract the seatbelt webbing back into the retractor.

Some seatbelt retractors are equipped with a locking or ratchet mechanism that can be engaged or locked to prevent extension of the seatbelt. One such type of seatbelt retractor is an automatic locking retractor (ALR). When an ALR is engaged, the ALR prevents extraction of a seatbelt while allowing retraction of the seatbelt. An ALR is typically used to secure a child restraint seat on the vehicle seat. A user activates (i.e., engages) the ALR by extracting the seatbelt from the retractor to a predetermined length at or near full extraction when installing the child restraint seat on the vehicle seat. The user then wraps the seatbelt around the child restraint seat and inserts the tongue of the seatbelt into the buckle to secure the child restraint seat. Once the seatbelt is buckled, the user allows the seatbelt to retract until the belt is taut around the child restraint seat. Alternatively, the user can extract enough of the seatbelt from the retractor to wrap the seatbelt around the child restraint seat and then insert the tongue of the seatbelt into the buckle. After the seatbelt is buckled the user can pull the seatbelt out beyond the predetermined length and then allow the seatbelt to retract until the seatbelt is taut around the child restraint seat. The ALR prevents the seatbelt from loosening over time and tightens the seatbelt when slack occurs, for example, as a result of a bumpy road or a shift in the position of the child restraint seat.

SUMMARY

A system according to the present disclosure includes a first webbing payout sensor and a seatbelt wear condition module. The first webbing payout sensor can detect a first webbing payout of a seatbelt associated with a seat of a vehicle. The first webbing payout is a first length of webbing of the seatbelt dispensed from a first retractor of the seatbelt. The seatbelt wear condition module can identify whether the seatbelt is worn correctly based on the first webbing payout.

In one aspect, the seatbelt wear condition module identifies that the seatbelt is worn incorrectly when the first webbing payout is less than a first value and a tongue of the seatbelt is engaged in a buckle of the seatbelt.

In one aspect, the seatbelt wear condition module identifies that the seatbelt is worn correctly when the first webbing payout is greater than a first value and less than a second value. The seatbelt wear condition module identifies that the seatbelt is worn incorrectly when the first webbing payout is greater than the second value.

In one aspect, the buckle is fixed to one of the seat and a body of the vehicle. A lower anchor of the seatbelt is fixed to one of the seat and the body. The first retractor is fixed with respect to the body and a floor of the vehicle. The seat is adjustable with respect to the first retractor along an axis. A back of the seat is tiltable with respect to the floor. The system further includes a seat position module. The seat position module adjusts the first value based on at least one of: a distance between the first retractor and the buckle and an angle between the back of the seat and the floor. The distance is measured in a direction parallel to the axis.

In one aspect, the system further includes a camera. The seat position module identifies at least one of (i) the distance between the first retractor and the buckle and (ii) the angle between the back of the seat and the floor based on an input from the camera.

In one aspect, the system further includes a second webbing payout sensor. The second webbing payout sensor detects a second webbing payout of the seatbelt associated with the seat. The second webbing payout is a second length of webbing of the seatbelt dispensed from a second retractor of the seatbelt. The seatbelt wear condition module identifies whether the seatbelt is worn correctly based on the first webbing payout and the second webbing payout.

In one aspect, the seatbelt wear condition module identifies that the seatbelt is worn incorrectly when the first webbing payout is less than a first value and a tongue of the seatbelt is engaged in a buckle of the seatbelt. The seatbelt wear condition module identifies that the seatbelt is worn incorrectly when the second webbing payout is less than a second value and the tongue of the seatbelt is engaged in the buckle of the seatbelt.

In one aspect, the seatbelt wear condition module identifies that the seatbelt is worn correctly based on whether the first webbing payout and the second webbing payout are within in a range.

In one aspect, the range is defined by a two-dimensional polygon that is a function of the first webbing payout and the second webbing payout.

In one aspect, the seatbelt wear condition module identifies that the seatbelt is worn incorrectly when a tongue of the seatbelt is engaged in a buckle of the seatbelt, and the first webbing payout and the second webbing payout are outside of the range.

In one aspect, the buckle is fixed to one of the seat and a body of the vehicle. The first retractor is fixed with respect to the body. The second retractor is fixed with respect to the body. The seat is adjustable with respect to the first retractor and the second retractor along an axis. The system further includes a seat position module. The seat position module adjusts the range based a first distance between the first retractor and the buckle and a second distance between the second retractor and the buckle. Each of the first distance and the second distance is measured in a direction parallel to the axis.

In one aspect, the buckle is fixed to one of the seat and a body of the vehicle. The first retractor is fixed with respect to a floor of the vehicle. The second retractor is fixed with respect to the floor. A back of the seat is tiltable with respect to the floor. The system further includes a seat position module. The seat position module adjusts the range based on an angle between the back of the seat and the floor.

In one aspect, the system further includes a vehicle speed control module. The vehicle speed control module controls a speed of the vehicle to at least one of decrease the speed of the vehicle and prevent the vehicle from moving when the seatbelt is worn incorrectly.

In one aspect, the system further includes a user interface device (UID) control module. The UID control module controls a UID to at least one of: sound an audible warning, issue a tactile warning, and display a message indicating whether the seatbelt is worn correctly.

A system according to the principles of the present disclosure includes a first ratchet sensor, a second ratchet sensor, and an automatic locking retractor (ALR) use module. The first ratchet sensor detects whether a first ratchet of a first seatbelt retractor associated with a seat of a vehicle is engaged with a first control disc of the first seatbelt retractor. The first seatbelt retractor allows a first webbing of a seatbelt to be extracted from the first seatbelt retractor when the first ratchet is disengaged from the first control disc. The first seatbelt retractor prevents the first webbing of the seatbelt from being extracted from the first seatbelt retractor when the first ratchet is engaged with the first control disc. The second ratchet sensor detects whether a second ratchet of a second seatbelt retractor associated with the seat is engaged with a second control disc of the second seatbelt retractor. The second seatbelt retractor allows a second webbing to be extracted from the second seatbelt retractor when the second ratchet is disengaged from the second control disc. The second seatbelt retractor prevents the second webbing from being extracted from the second seatbelt retractor when the second ratchet is engaged with the second control disc. The ALR use module identifies whether the first seatbelt retractor and the second seatbelt retractor are used correctly based on input from the first ratchet sensor and the second ratchet sensor.

In one aspect, the system further includes a vehicle speed control module. The vehicle speed control module controls a speed of the vehicle to at least one of decrease the speed of the vehicle and prevent the vehicle from moving when at least one of the first seatbelt retractor and the second seatbelt retractor is used incorrectly.

In one aspect, the system further includes a user interface device (UID) control module. The UID control module controls a UID to at least one of: sound an audible warning, issue a tactile warning, and display a message indicating whether the first seatbelt retractor and the second seatbelt retractor are used correctly.

In one aspect, the ALR use module identifies that the first seatbelt retractor and the second seatbelt retractor are used incorrectly when one of the first ratchet and the second ratchet is engaged with the corresponding one of the first control disc and the second control disc, and the other one of the first ratchet and the second ratchet is disengaged from the corresponding one of the first control disc and the second control disc.

A system according to the principles of the present disclosure includes a ratchet sensor, an automatic locking retractor (ALR) use module, and a vehicle speed control module. The ratchet sensor detects whether a ratchet of a seatbelt retractor associated with a seat of a vehicle is engaged with a control disc of the seatbelt retractor. The seatbelt retractor allows webbing of a seatbelt to be extracted from the seatbelt retractor when the ratchet is disengaged from the control disc. The seatbelt retractor prevents the webbing of the seatbelt from being extracted from the seatbelt retractor when the ratchet is engaged with the control disc. The ALR use module identifies whether the seatbelt retractor is used correctly based on input from the ratchet sensor. The vehicle speed control module controls a speed of the vehicle to at least one of decrease the speed of the vehicle and prevent the vehicle from moving when the seatbelt retractor is used incorrectly.

In one aspect, the system further includes a user interface device (UID) control module. The UID control module controls a UID to at least one of: sound an audible warning, issue a tactile warning, and display a message indicating whether the seatbelt retractor is used correctly.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3A is a perspective view of a webbing payout sensor and a seatbelt webbing spool according to the principles of the present disclosure;

FIG. 3B is a partial side view of the webbing payout sensor and the seatbelt webbing spool of FIG. 3A;

FIG. 4 is a perspective view of another webbing payout sensor and a seatbelt webbing spool according to the principles of the present disclosure;

In the drawings, reference numbers may be reused to identify similar and/or identical elements.

DETAILED DESCRIPTION

Figure 1:
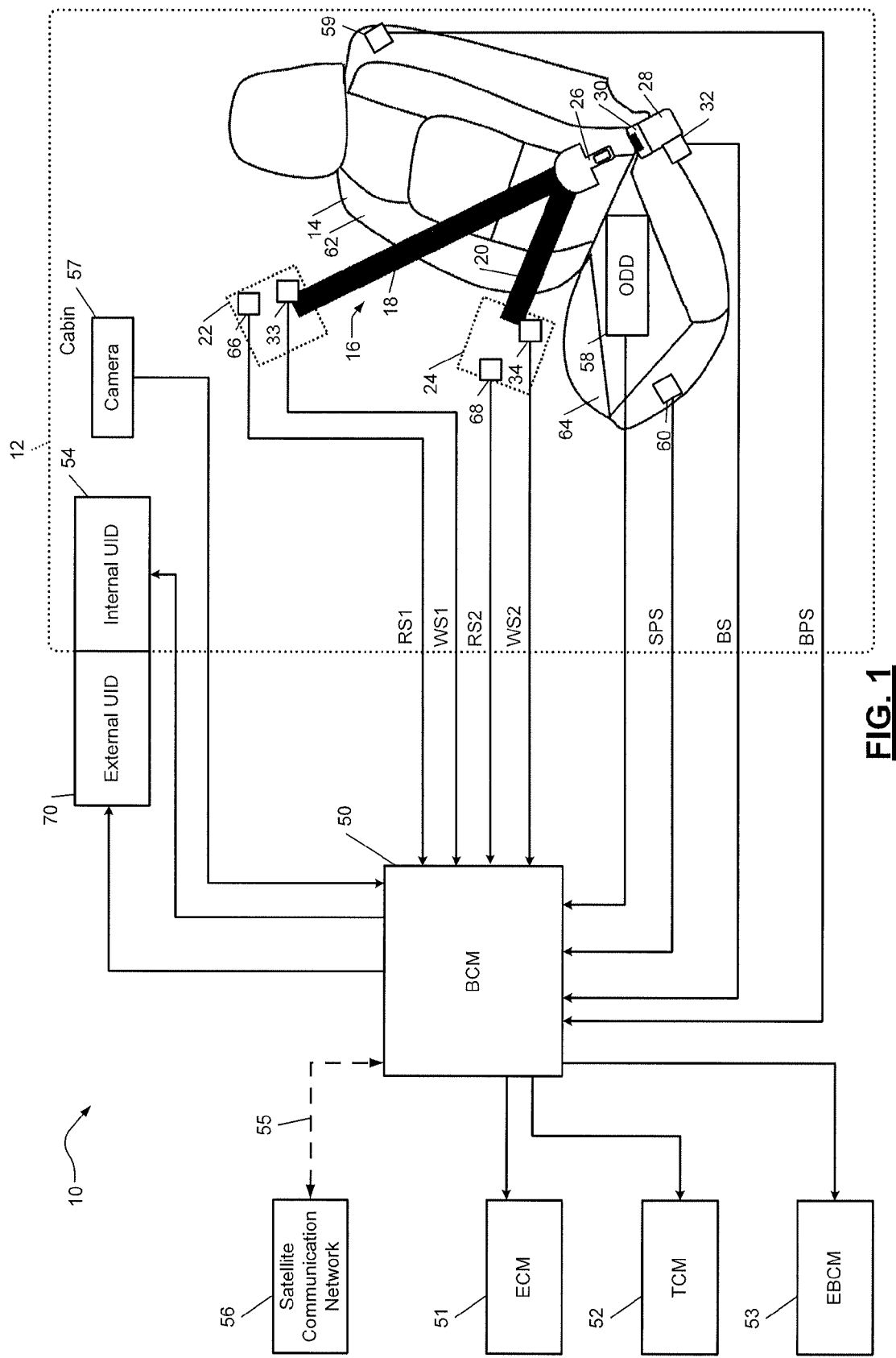
FIG. 1 is a functional block diagram of an example vehicle system including a body control module according to the principles of the present disclosure, and a perspective view of an example seat assembly having dual seatbelt retractors according to the principles of the present disclosure.

In some cases, an occupant may use a seatbelt improperly. Improper use of the seatbelt may include failing to buckle the seatbelt, incorrectly wearing the seatbelt webbing, or incorrectly using the ALR. Examples of incorrectly wearing the seatbelt webbing include placing the entire seatbelt under the occupant instead of around the occupant, placing the shoulder webbing behind the occupant's back, or placing the lap webbing under the occupant's bottom. Incorrectly using the ALR may include failing to engage the ALR when a seatbelt-attached child restraint seat is present in a vehicle seat or an inadvertently engaging the ALR when a belted occupant who is not seated in a child restraint seat is present in a vehicle seat.

A control system according to the present disclosure determines whether the seatbelt is worn incorrectly based on a seatbelt webbing payout (a length of seatbelt extracted from the retractor). For example, the control system may identify that the seatbelt is worn incorrectly when the seatbelt webbing payout is less than a predetermined value. In addition, the control system may audibly warn the occupant, decrease the speed of the vehicle, or prevent the vehicle from moving when the seatbelt is worn incorrectly. Alternatively or additionally, the control system may control an electronic display to display a message indicating that the seatbelt is incorrectly used. Providing audible warnings, decreasing the speed of the vehicle, preventing the vehicle from moving, and controlling the electronic display in the manner described above may be considered corrective actions that encourage proper seatbelt usage.

A seatbelt assembly may include dual retractors—a first retractor for shoulder webbing and a second retractor for lap webbing. When a seatbelt assembly includes dual retractors, the control system determines whether the seatbelt is incorrectly used based on a first webbing payout of the first retractor and a second webbing payout of the second retractor. For example, the control system may identify that the seatbelt is worn incorrectly when the first webbing payout is less than a first value and/or the second webbing payout is less than a second value. In another example, the control system may identify that the seatbelt is worn incorrectly when the first webbing payout and the second webbing payout are outside of a predetermined range. Thus, the control system may increase proper seatbelt usage in moving vehicles, such as a shared autonomous vehicle.

A control system according to the present disclosure may also determine whether a first ALR and a second ALR are incorrectly used based on whether a first ratchet of the first ALR is engaged with a first control disc of the first ALR and whether a second ratchet of the second ALR is engaged with a second control disc of the second ALR. The control system may decrease the speed of the vehicle or prevent the vehicle from moving when the first and second ALRs are incorrectly used. Alternatively or additionally, the control system may control audible feedback or an electronic display to display a message indicating that the first and second ALRs are incorrectly used.

Referring to FIG. 1, an example vehicle system 10 includes a cabin 12 with a seat 14 having a seatbelt 16. The seatbelt 16 includes a first or shoulder webbing 18 and a second or lap webbing 20. The shoulder webbing 18 is dispensed from a first retractor 22 and the lap webbing 20 is dispensed from a second retractor 24. More specifically, an occupant may pull the seatbelt 16 from the first and second retractors 22, 24 until the seatbelt 16 is an appropriate length to be buckled. The occupant can secure the seatbelt 16 by inserting a tongue 26 of the seatbelt 16 into a buckle interface or buckle 28. The occupant can release the seatbelt 16 or unbuckle the seatbelt 16 by pressing a seatbelt button 30 on the buckle 28. The first and second retractors 22, 24 can then retract the seatbelt 16. Although the first and second retractors 22, 24 are shown as being mounted to the vehicle structure within in the cabin 12, they may alternatively be mounted to the seat 14 (not shown).

The shoulder webbing 18 and the lap webbing 20 are fixed to one another as well as the tongue 26. For example, the tongue 26 may be sewn into the lap webbing 20 and the shoulder webbing 18. Alternatively, the tongue 26 may be sewn into the lap webbing 20 and the shoulder webbing 18 may be mechanically fastened to the tongue 26. In various implementations, the seatbelt 16 may be routed through one or more guide loops (not shown). In various implementations, a portion of the shoulder webbing 18 and/or the lap webbing 20 may be routed under the trim surfaces so that they are not visible to the occupant.

The buckle 28 can be in a buckled position or an unbuckled position. When the buckle 28 is in a buckled position, a locking member (not shown) within the buckle 28 engages the tongue 26 to secure the tongue 26 in the buckle 28. When the seatbelt button 30 is pressed, the locking member disengages the tongue 26 and a spring-loaded ejector mechanism (not shown) biases the locking member into the unbuckled position. The locking member remains in the unlocked position until the tongue 26 is inserted into the buckle 28, forcing the locking member into the buckled position to secure the tongue 26.

A buckle sensor 32, which may be a buckle switch, detects whether the tongue 26 of the seatbelt 16 is secured in the buckle 28 based on the position of the spring-loaded ejector mechanism or the tongue 26. Alternatively, the buckle sensor 32 may detect whether the seatbelt button 30 is pressed. The buckle sensor 32 may be a Hall-effect sensor that varies its voltage output in response to a magnetic field. The buckle sensor 32 generates a buckle sensor (BS) signal indicating whether the tongue 26 of the seatbelt 16 is secured in the buckle 28 and/or whether the seatbelt button 30 is pressed. The buckle sensor 32 may alternatively be a reed switch, mechanical sensor, or any other sensor or switch that detects whether the tongue 26 is secured in the buckle 28.

The first and second retractors 22, 24 may be ALRs and may be referred to as first and second ALRs, respectively. As such, the first retractor 22 includes a first spool attached to a first control disc (not shown). When the occupant extracts the first webbing 18 of the seatbelt 16 from the first retractor 22 to a first predetermined length at or near full extraction, a first ratchet (not shown) engages the first control disc to prevent rotation of the first spool and the first control disc in the direction of first webbing 18 extraction. However, engagement of the first ratchet with the first control disc in does not prevent retraction of the first webbing 18. Thus, until the first retractor 22 is deactivated (i.e., the first webbing 18 is retracted to a second predetermined length disengage the first ratchet from the first control disc), the control disc and the first spool can only rotate in one direction and the first webbing 18 can tighten (i.e., retract), but cannot loosen (i.e., extend).

The second retractor 24 may be similar to the first retractor 22, and may also be an ALR. More specifically, the second retractor 24 includes a second spool attached to a second control disc (not shown). When the occupant extracts the second webbing 20 of the seatbelt 16 from the second retractor 24 to the first predetermined length, a second ratchet (not shown) engages the second control disc to prevent rotation of the second spool and the second control disc in the direction of second webbing 20 extraction. However, engagement of the second ratchet with the second control disc in does not prevent retraction of the second webbing 20. Thus, until the second retractor 24 is deactivated (i.e., the second webbing 20 is retracted to the second predetermined length to disengage the second ratchet from the second control disc), the second control disc and the second spool can only rotate in one direction and the second webbing 20 can tighten (i.e., retract), but cannot loosen (i.e., extend). Although the first and second retractors 22, 24 are described as ALRs, in various other implementations, the first and second retractors 22, 24 may not be ALRs. When the first and second retractors 22, 24 are not ALRs, they may dispense and retract the seatbelt 16 without providing the function of securing a child restraint seat.

The occupant typically deactivates the first retractor 22 by retracting the first webbing 18 into the first retractor 22 to the second predetermined length. Retracting the first webbing 18 to the second predetermined length may include retracting a significant portion of first webbing 18 into the first retractor 22. In one example, retracting the first webbing 18 into the first retractor 22 includes retracting almost the entire first webbing 18 into the first retractor 22. The occupant may similarly deactivate the second retractor 24 by retracting the second webbing 20 into the second retractor 24 to the second predetermined length. When the occupant retracts the first webbing 18 or the second webbing 20 to the second predetermined length, the respective first or second ratchet disengages from the respective first or second control disc. The retraction of the respective webbing 18, 20 to the second predetermined length enables the first or second control disc and the respective first or second spool to freely rotate in either direction. The occupant can then use the seatbelt 16 normally or engage one or both of the ALRs 22, 24 by extracting the respective webbing 18, 20 from the respective retractor 22, 24 to the first predetermined length.

The first retractor 22 includes a first webbing sensor 33. The first webbing sensor 33 generates a first webbing sensor (WS1) signal indicating a first webbing payout. The first webbing payout corresponds to a length of first webbing 18 of the seatbelt 16 dispensed from the first retractor 22. The second retractor 24 includes a second webbing sensor 34. The second webbing sensor 34 generates a second webbing sensor (WS2) signal indicating a second webbing payout. The second webbing payout corresponds to a length of second webbing 20 of the seatbelt 16 disposed from the second retractor 24.

Referring to FIGS. 3A and 3B, an example implementation of the first or second webbing sensor 33, 44 (FIG. 1) may be a Hall-effect sensor 35A. The Hall-effect sensor 35A may be disposed within a seatbelt retractor 36A. For example, the retractor 36A may be similar to the first retractor 22 or the second retractor 24 of FIG. 1. The retractor 36A may include a rotatable spool 37A for dispensing seatbelt webbing 38A. The seatbelt webbing 38A may be similar to the first webbing 18 or the second webbing 20 of the seatbelt 16 of FIG. 1. The seatbelt webbing 38A may be pulled in a first direction 39A to extract the seatbelt webbing 38A from the retractor 36A. As the seatbelt webbing 38A is pulled in the first direction 39A, the spool 37A rotates in a second direction 40A.

The retractor 36A may further include a control disc 41A and a lever 42A. The control disc 41A rotates together with the spool 37A. The lever 42A is pivotable about a pivot point 43A. The lever 42A may be biased to remain in contact with a side or edge 44A of the control disc 41A, for example by a spring (not shown). The control disc 41A may include a cam surface 45A, which may include a cam lift 46A.

As the control disc 41A rotates in the second direction 40A during extraction of the seatbelt webbing 38A, the lever 42A rides along the edge 44A of the control disc 41A. The lever 42A remains in contact with the edge 44A of the control disc 41A as the cam surface 45A rotates past the lever 42A. The lever 42A pivots toward the cam surface 45A about the pivot point 43A, for example, by a distance equal to the cam lift 46A. The lever 42A includes a magnet 47A. As the lever 42A pivots about the pivot point 43A, the magnet 47A changes proximity to the Hall-effect sensor 35A, causing a change in voltage state. Thus, a position of the lever 42A can be determined based on output from the Hall-effect sensor 35A. The position of the lever 42A may correlate with an angular position of the control disc 41A (e.g., the control disc 41A has made a complete rotation each time the lever 42A pivots toward the cam surface 45A). The length of seatbelt webbing (i.e., seatbelt webbing payout) can be determined based on a predetermined relationship between the angular position of the control disc 41A and seatbelt webbing payout. In various implementations, the cam lift 46A and cam surface 45A may be geometrically different than shown in FIGS. 3A and 3B. In one example, the control disc 41A includes multiple cam lifts 46A and cam surfaces 45A. In another example, angular locations of the cam lift 46A and the cam surface 45A may be shifted.

In various implementations, there may be reduction gearing between the rotatable spool 37A and the control disc 41A so that the control disc 41A can turn either slower or quicker than rotatable spool 37A depending on how the gearing is configured. The control disc 41A may include additional components (not shown). In various implementations, the control disc 41A and lever 42A may be the control disc and ratchet of an ALR. For example, the control disc 41A may be the first control disc of the first ALR 22 and the lever 42A may be the first ratchet of the first ALR 22. The control disc 41A may alternatively be the second control disc of the second ALR 24 and the lever 42A may alternatively be the second ratchet of the second ALR 24.

Referring now to FIG. 4, another example implementation of the first or second webbing sensor 33, 34 (FIG. 1) may be an optical sensor 35B. The optical sensor 35B may be disposed within a seatbelt retractor 36B. For example, the retractor 36B may be similar to the first retractor 22 or the second retractor 24 of FIG. 1. The retractor 36B may include a rotatable spool 37B for dispensing seatbelt webbing 38B. The seatbelt webbing 38B may be similar to the first webbing 18 or the second webbing 20 of FIG. 1. The seatbelt webbing 38B may be pulled in a first direction 39B to extract the seatbelt webbing 38B from the retractor 36B. As the seatbelt webbing 38B is pulled in the first direction 39B, the spool 37B rotates in a second direction 40B.

A surface 48B of the spool 37B that faces the optical sensor 35B may include a plurality of colored markings, patches, or striations 49B. The striations 49B may be circumferentially-disposed about an axis of rotation of the spool 37B. In one example, the striations 49B are be equally sized and spaced. As the spool 37B rotates in the second direction 40B, the optical sensor 35B senses a change in color as the striations 49B rotate in and out of a sensed area. A quantity of striations 49B correlates with an angular position of the spool 37B. Thus, the length of seatbelt webbing (i.e., seatbelt webbing payout) can be determined based on a predetermined relationship between the angular position of the spool 37B and seatbelt webbing payout.

The quantity of striations 49B can be increased to increase the sensitivity of the optical sensor. In one example, the striations 49B may have a very small width (e.g., similar to striations in a barcode) and the sensitivity of the optical sensor 35B may be relatively high. In various implementations, the striations 49B may be located on any other element that moves based on a known relationship to the spool 37B. For example, the striations 49B may be disposed on another element that is geared from the spool 37B (not shown).

Returning to FIG. 1, the outputs of the first webbing sensor 33 and the second webbing sensor 34 are inputs to a body control module (BCM) 50. The BCM 50 may identify when the seatbelt 16 is incorrectly worn based on the WS1 signal and the WS2 signal. Incorrect wearing of the seatbelt 16 may be referred to as a seatbelt use error. The BCM 50 may identify that the seatbelt is worn incorrectly when the first webbing payout is less than a first value, the second webbing payout is less than a second value, or both the first webbing payout is less than a first value and the second webbing payout is less than a second value. The BCM 50 may also identify that the seatbelt is worn incorrectly when the first webbing payout and the second webbing payout are outside of a range. The BCM 50 may control the speed of the vehicle based on the WS1 signal and the WS2 signal. For example, the BCM 50 may reduce the speed of the vehicle, including stopping the vehicle, or prevent the vehicle from moving when the occupant is incorrectly wearing the seatbelt 16.

The BCM 50 may control an internal user interface device (UID) 54 in the cabin 12 of the vehicle, such as an audible warning, an electronic display, or tactile feedback to display a message indicating that the seatbelt use error is present. For example, the BCM 50 controls the internal UID 54 to generate a visual message (e.g., text, a light, and/or a symbol), an audible message (e.g., a chime), and/or a tactile message (e.g., a vibration) indicating that the seatbelt use error is present. The BCM 50 may determine whether the seatbelt use error is present based on the WS1 signal and the WS2 signal. The occupant may interact with the UID 54 to acknowledge the message, in which case the BCM 50 may disable (e.g., stop generating) the message.

The BCM 50 may also control the speed of the vehicle by sending vehicle speed control instruction to at least one of an engine control module (ECM) 51, a transmission control module (TCM) 52, and an electronic brake control module (EBCM) 53. The ECM 51 controls an engine (not shown). The TCM 52 controls operation of a transmission (not shown). The TCM 52 may control gear selection within the transmission and one or more torque transfer devices (e.g., a torque converter, one or more clutches, etc.) (not shown). The EBCM 53 selectively controls electronically-controlled friction brakes of the vehicle (not shown).

Additionally or alternatively, the BCM 50 may generate a wireless signal 55 to communicate the message to a third party via a satellite communication network 56. For example, the BCM 50 may send an alert to a vehicle assistance provider, a control center (e.g., for autonomous vehicles), and/or emergency personnel. The BCM 50 may also send an alert to the mobile phone of the occupant or a third party (e.g., via text or email). The satellite communication network 56 may also be an input to the BCM 50, such as when a third party confirms receipt of the message. In one example, the third party, such as a control center, may access a camera 57 disposed within the cabin 12 to review a status of the buckle use or seatbelt use or ALR use error. The control center may optionally remove the message and permit the vehicle to move.

The vehicle system 10 may also include an occupant detection device 58, such as a weight pad. The weight pad measure may measure the weight of objects or people in the seat 14. The occupant detection device 58 may alternatively include pressure sensors, capacitive sensors, and/or other types of sensors. Weight, pressure, and capacitive sensor systems are typically located within the seat.

An output of the occupant detection device 58 is an input to the BCM 50. The BCM 50 may not instruct the ECM 51, the TCM 52, and the EBCM 53 to adjust the speed of the vehicle based on the first or second webbing payout when the occupant detection device 58 indicates that the seat 14 is unoccupied.

In various implementations, the camera 57 can be used to detect occupant presence. The camera 57 may take continuous images or take images at specific times (e.g., before, during, or after the ride). An output of the camera may be an input to the BCM 50. For example, the BCM 50 may detect edges of an object in the seat 14 in an image from the camera 57. In various implementations, the BCM 50 may also use the output from camera 57 to detect a size of the occupant. The BCM 50 may use the size of the occupant to adjust the first value, the second value, and the range (the threshold webbing lengths to identify whether the seatbelt is worn correctly).

The BS signal is also an input to the BCM 50. The BCM 50 identifies that the tongue 26 of the seatbelt 16 is disengaged from the buckle 28 based on the BS signal and/or the input from the occupant detection device 58. The BCM 50 may not instruct the ECM 51, the TCM 52, and/or the EBCM 53 to adjust the speed of the vehicle when the BS signal indicates that the tongue 26 of the seatbelt 16 is disengaged from the buckle 28 of the seatbelt 16 or the occupant detection device indicates that an occupant is not present. Additionally or alternatively, the BCM 50 may instruct the ECM 51, the TCM 52, and/or the EBCM 53 to adjust the speed of the vehicle when the BS signal indicates that the tongue 26 of the seatbelt 16 is disengaged from the buckle 28 of the seatbelt 16 if the occupant detection device 58 or the camera 57 indicates that the occupant is present.

The vehicle system further includes a back position sensor 59 and a seat position sensor 60. The back position sensor 59 is located on a back 62 of the seat 14 and the seat position sensor 60 is located on a base 64 of the seat 14. The outputs of the back position sensor 59 and the seat position sensor 60 are inputs to the BCM 50. The back position sensor 59 generates a back position sensor (BPS) signal indicating a position of the seat back 62 with respect to one or both of the first retractor 22 and the second retractor 24. The seat position sensor generates a seat position sensor (SPS) signal indicating a position of the seat base 64 with respect to one or both of the first retractor 22 and the second retractor 24.

In one example, the back position sensor 59 and the seat position sensor 60 are discrete position switches that detect seat position relative to a discrete point on a body of the vehicle. In another example, the back position sensor 59 and the seat position sensor 60 provide continuous position information. As discussed in greater detail below, the BCM 50 may adjust the first value, the second value, and the range (the threshold webbing lengths to identify whether the seatbelt is worn correctly) based on the BPS signal and the SPS signal.

Additionally or alternatively, the BCM 50 may use the output from the camera 57 to determine seat position. For example, the BCM 50 may detect edges of the seat back 62 and the seat base 64 or portions of surfaces of the seat back 62 and the seat base 64 in an image from the camera 57. The BCM 50 can determine the length of locations and angles of the edges or surfaces based on a predetermined relationship between locations and angles in the image and locations and angles of edges in a predetermined original seat position profile. The BCM 50 determines the seat position relative to the first and second retractors 22, 24 based on a comparison between the image and the predetermined original seat position profile.

The vehicle system 10 further includes a first ratchet sensor 66 and a second ratchet sensor 68. The first ratchet sensor 66 detects a position of the first ratchet, indicating whether the first ratchet is engaged with the first control disc of the first ALR 22. The second ratchet sensor 68 detects a position of the second ratchet, indicating whether the second ratchet is engaged with the second control disc of the second ALR 24. The first ratchet sensor 66 generates a first ratchet sensor (RS1) signal and the second ratchet sensor 68 generates a second ratchet sensor (RS2) signal. The RS1 signal and the RS2 signal are inputs to the BCM 50.

The BCM 50 may also generate a signal or control the internal UID 54 to display a message indicating that an ALR use error is present. The ALR use error may be present when one or both of the first and second locking ALRs 22, 24 are disengaged when they should be engaged (e.g., when a child restraint seat is present in the seat 14), or when one or both of the first and second ALRs 22, 24 are engaged when they should be disengaged (e.g., when the occupant is seated on the seat 14 without a child restraint seat). The BCM 50 determines whether the ALR use error is present based on the RS1 signal and the RS2 signal. Additionally or alternatively, the BCM 50 may generate the wireless signal 55 to communicate the message to a third party via the satellite communication network 56. Additionally or alternatively, the BCM 50 may communicate the message outside of the vehicle by an external UID 70. The External UID 70 may include an electronic display disposed on an exterior of the vehicle. For example, the BCM 50 controls the external UID 70 to generate a visual message (e.g., text, a light, and/or a symbol) and/or an audible message (e.g., a chime) indicating that the ALR use error is present.

The BCM 50 may control a speed of the vehicle based on the RS1 signal and the RS2 signal. For example, the BCM 50 determines that the ALR use error is present when one of the first ALR 22 and the second ALR 24 is engaged (i.e., the first or second ratchet is engaged with the respective first or second control disc) and the other of the first ALR 22 and the second ALR 24 is disengaged (i.e., the first or second ratchet is disengaged from the respective first or second control disc). The BCM 50 communicates a warning, reduces the speed of the vehicle, or prevents the vehicle from moving when the ALR use error is identified.

Figure 2:
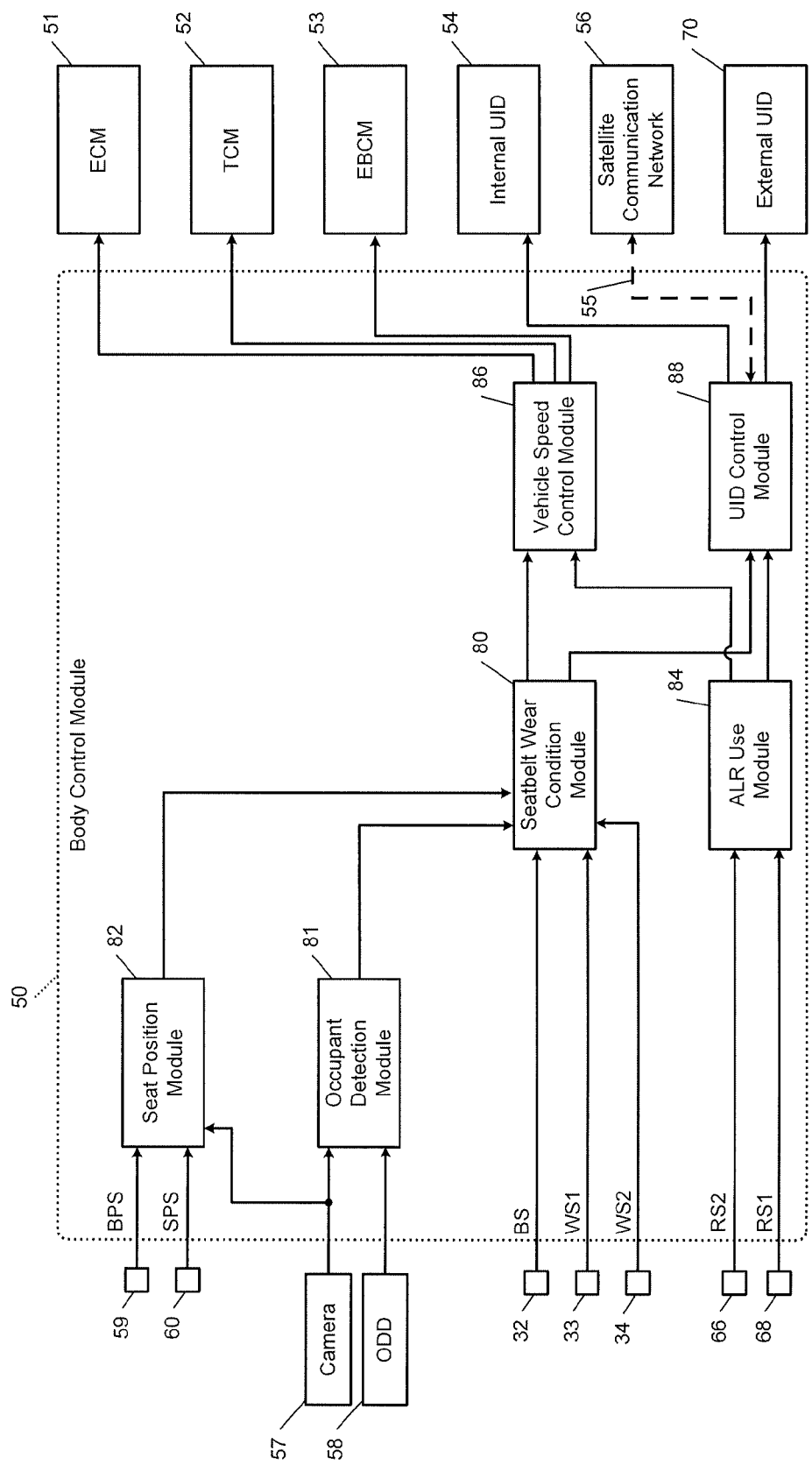
FIG. 2 is a functional block diagram of the body control module of FIG. 1.

Referring now to FIG. 2, an example implementation of the BCM 50 includes a seatbelt wear condition module 80, an occupant detection module 81, a seat position module 82, an ALR use module 84, a vehicle speed control module 86, and a UID control module 88. The seatbelt wear condition module 80 determines whether a seatbelt use error is present (i.e., whether the occupant is incorrectly using the seatbelt) based on inputs from the buckle sensor 32, the first webbing sensor 33, the second webbing sensor 34, the occupant detection module 81, and/or the seat position module 82. In various implementations, the seatbelt wear condition module 80 may also determine whether the tongue 26 of the seatbelt 16 is disengaged from the buckle 28 of the seatbelt 16 when an occupant is present in the seat 14 based on input from the buckle sensor 32 and the occupant detection module 81.

Figure 5B:
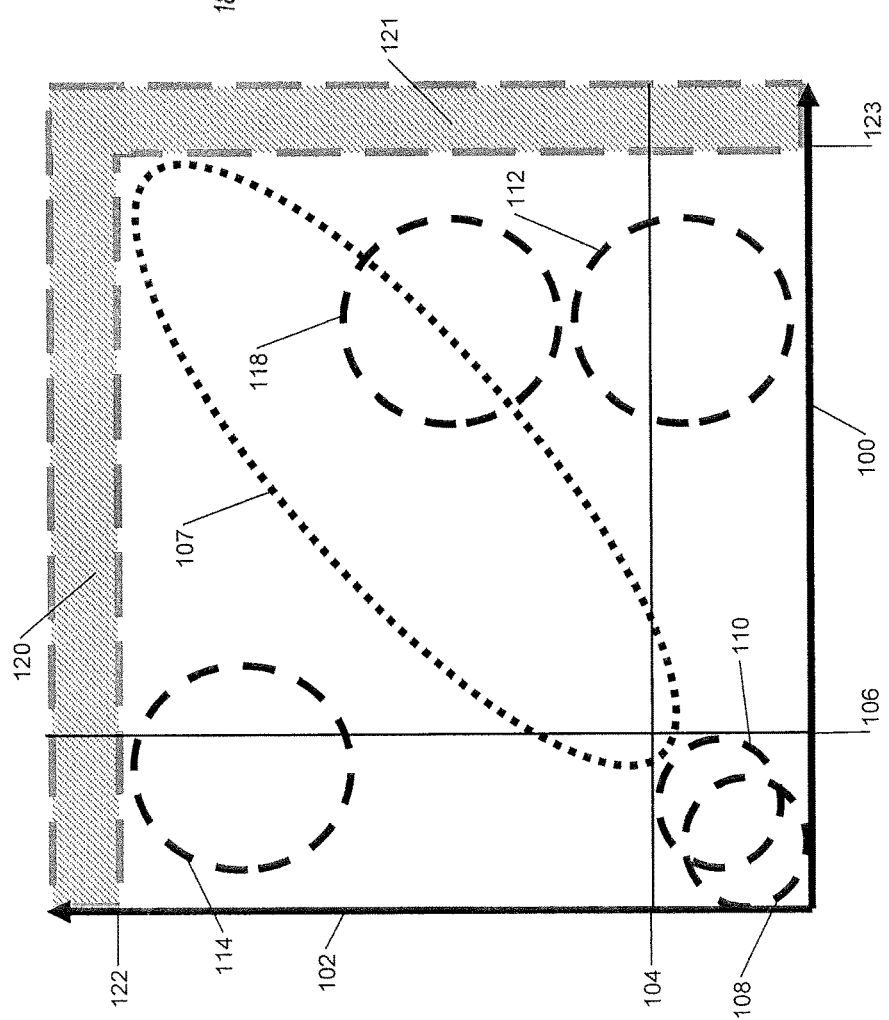
FIG. 5B is a perspective view of an occupant in the seat assembly of FIG. 1 showing seatbelt usage within the ranges of correct and incorrect seatbelt usage of FIG. 5A.
Figure 5A:
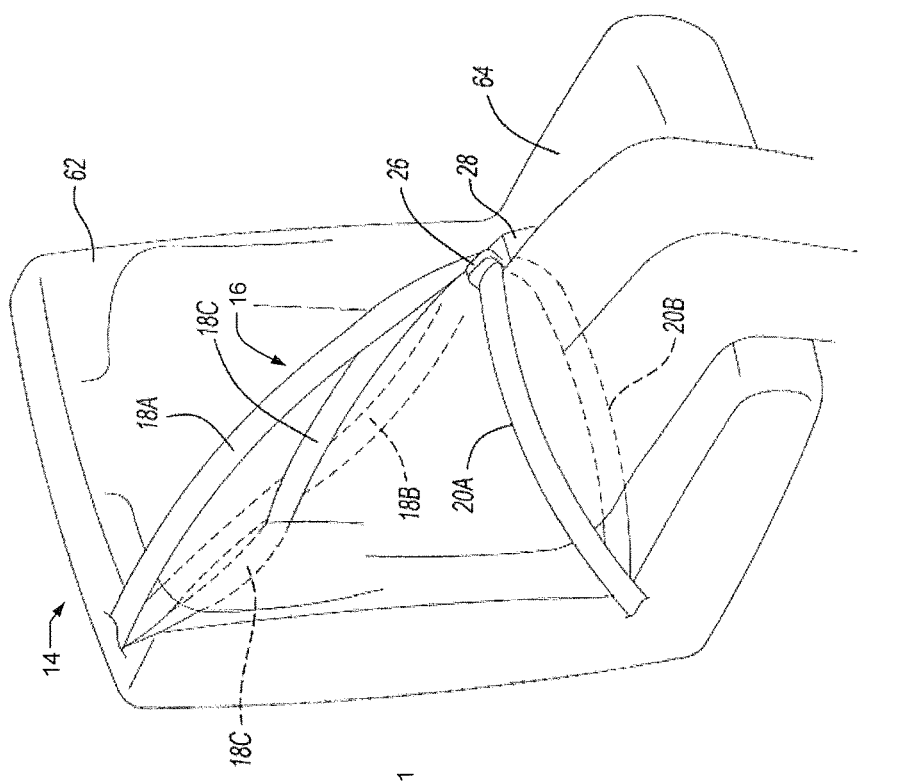
FIG. 5A is a graphical representation of seatbelt usage of the vehicle system of FIG. 1 showing a first webbing payout length on the y-axis, a second webbing payout length on the x-axis, and ranges of correct and incorrect seatbelt usage based on the first webbing payout length and the second webbing payout length.

Referring to FIG. 5A, a graphical representation of the seatbelt 16 usage is shown. The x-axis 100 represents the second webbing payout as detected by the second webbing sensor 34. The y-axis 102 represents the first webbing payout as detected by the first webbing sensor 33. The BCM 50 may determine whether the seatbelt use error is present based on the first webbing payout and the second webbing payout when the tongue 26 of the seatbelt 16 is engaged with the buckle 28. The BCM 50 may also determine whether the seatbelt use error is present based on the first webbing payout and the second webbing payout when the tongue 26 of the seatbelt 16 is engaged with the buckle 28 and the occupant is present in the seat 14.

In one example, the BCM 50 identifies the seatbelt use error when the first webbing payout is less than a first value 104, the second webbing payout is less than a second value 106, or both the first webbing payout is less than the first value 104 and the second webbing payout is less than the second value 106. The graphical representation may also include predefined ranges of correct and incorrect seatbelt usage. The ranges may be defined by other two-dimensional polygons, such as circles, ellipses, or any other shapes, which are functions of the first webbing payout and the second webbing payout. In this manner, correct seatbelt usage would be defined by the space within the polygon and incorrect seatbelt usage would be defined by the space outside of the polygon. In another example, the BCM 50 identifies that the seatbelt use error is present when the first webbing payout and the second webbing payout are outside of a predetermined range corresponding to correct seatbelt usage. In yet another example, the BCM 50 identifies that the seatbelt error is present when the first webbing payout and the second webbing payout are within a predetermined range corresponding to incorrect seatbelt usage.

The seatbelt may be worn correctly if the first webbing payout is greater than or equal to the first value 104 and the second webbing payout is greater than or equal to the second value 106. In some examples, the seatbelt 16 is worn correctly when the first webbing payout and the second webbing payout are within a first range 107. The first range 107 may overlap first value 104 and second value 106 (as shown), not overlap first range first value 104 and second value 106, or only overlap one of these values. Alternatively the first range 107 can be bounded by one or more of the first value 104, the second value 106, and other values (e.g., the third value 122 and the fourth value 123 discussed below).

The first range 107 may be broad enough to encompass various proper seatbelt use scenarios. As shown in FIG. 5B, the occupant may be correctly wearing the seatbelt 16 where he or she is seated directly on the vehicle seat 14 with a lap webbing 20A extending over the lap and a shoulder webbing 18A extending diagonally over the shoulder and across the torso. The occupant may also be correctly wearing the seatbelt 16 when an occupant is seated directly in the vehicle seat 14 and the shoulder and lap webbing 18A, 20A are routed through a routing assist device (e.g., to ensure proper placement of the shoulder webbing 18A on a smaller occupant, not shown). The occupant may also be correctly wearing the seatbelt 16 when he or she is seated in a backless booster seat that is placed between the occupant and the vehicle seat 14 with the seatbelt 16 extending around both the occupant and the backless booster seat (e.g., an inflated booster seat or a backless booster seat, not shown).

Returning to FIG. 5A, a second range 108 corresponds to incorrect seatbelt use. First and second webbing payouts falling within or near the second range 108 may indicate that the seatbelt 16 is not extracted from the retractors 22, 24 and secured around the occupant. In one example, the tongue 26 of the seatbelt 16 is not inserted into the buckle 28 (i.e., the seatbelt is not buckled). In another example, the occupant inserts the tongue 26 associated with the seatbelt 16 into a buckle other than the buckle 28 (e.g., cross-buckling, where a tongue associated with a different seatbelt is inserted in to the buckle 28 associated with the seatbelt 16). In yet another example, the occupant inserts a fake tongue or latch plate into the buckle 28 (e.g., a separate latch plate that is not associated with or attached to seatbelt webbing at all). In various implementations, a seatbelt use error associated with cross-buckling or a fake latch plate may be prevented by using keyed latch plates or tongues that can only be engaged with a buckle of the same seat.

A third range 110 also corresponds to incorrect seatbelt use. First and second webbing payouts falling within or near the third range 110 may indicate that the seatbelt 16 is disposed under the occupant's body (e.g., the occupant is seated on a buckled seatbelt). More specifically, as shown in FIG. 5B, the tongue 26 of the seatbelt 16 is engaged in the buckle 28 of the seatbelt 16, a shoulder webbing 18B is disposed between the seat back 62 and the occupant's back, and the lap webbing 20A is disposed between the seat base 64 or a lower portion of the seat back 62 and the occupant's bottom.

Returning to FIG. 5A, the seatbelt 16 may also be incorrectly worn when the first webbing payout is less than the first value 104 and the second webbing payout is greater than or equal to the second value 106. A fourth range 112 also corresponds to incorrect seatbelt use. First and second webbing payouts falling within or near the fourth range 112 indicate that the second webbing payout is much longer than the first webbing payout. As shown in FIG. 5B, the second webbing payout may be much longer than the first webbing payout when the occupant is wearing the shoulder webbing 18B incorrectly and the occupant is wearing the lap webbing 20A correctly. The occupant may incorrectly wear the shoulder webbing 18B by placing it behind his or her back. The occupant may correctly wear the lap webbing 20 by placing it around and over his or her lap.

Returning to FIG. 5A, the seatbelt 16 may also be incorrectly worn when the second webbing payout is less than the second value 106 and the first webbing payout is greater than or equal to the first value 104. A fifth range 114 also corresponds to incorrect seatbelt use. First and second webbing payouts falling within or near the fifth range 114 indicate that the first webbing payout is much longer than the second webbing payout. As shown in FIG. 5B, the first webbing payout may be much longer than the second webbing payout when the occupant is wearing the shoulder webbing 18A correctly and the occupant is wearing a lap webbing 20B incorrectly. The occupant may correctly wear the shoulder webbing 18A by extending it over his or her shoulder, and down to the buckle 28. The occupant may incorrectly wear the lap webbing 20B by sitting on the lap webbing 20B.

Returning to FIG. 5A, a sixth range 118 also corresponds to incorrect seatbelt use. First and second webbing payouts falling within or near the sixth range 118 are greater than the respective first and second values 104, 106. The sixth range 118 may represent an occupant's correct use of the lap webbing 20 and incorrect use of the shoulder webbing 18. For example, returning to FIG. 5B, a shoulder webbing 18C may be disposed under the occupant's arm rather than over the occupant's shoulder. As shown in FIG. 5A, some of the sixth range 118 may fall within the first range 107 or overlap the first range 107 representing correct seatbelt usage. Thus, when the first range 107 and the sixth range 118 are represented by the polygons as shown to determine correct or incorrect seatbelt usage, only a portion of occupants have the shoulder webbing 18 under the arm instead of over the shoulder may be properly classified as incorrect seatbelt usage.

As will be discussed in greater detail below, a seventh range 120 and an eighth range 121 correspond to incorrect seatbelt usage. The seventh range 120 corresponds to incorrect seatbelt use when the first webbing payout falls within the seventh range 120 and the second webbing payout does not fall within the eighth range 121. Likewise, the eighth range 121 corresponds to incorrect seatbelt use when the second webbing payout falls within the eighth range 121 and the first webbing payout does not fall within the seventh range 120. When the first payout is in the seventh range 120, and the second payout is in the eighth range 121, the BCM 50 can classify this as either correct seatbelt usage or incorrect seatbelt usage.

Additional ranges of correct seatbelt use may be defined. Additional ranges of incorrect seatbelt usage may also be defined, for example, to describe other incorrect seatbelt usage scenarios. Examples of other incorrect seatbelt usage scenarios include the placement of the shoulder webbing 18 off of the shoulder and on the arm, the placement of the shoulder webbing 18 on the wrong side of the occupant's head, and the placement of the shoulder webbing 18 behind the seat back 62. The correct and incorrect seatbelt ranges may have different sizes or shapes than those depicted in FIG. 5A. The first webbing payout and the second webbing payout, or relationships between of the first and second webbing payouts (e.g., the ratio or a difference) may be compared against other criteria to identify incorrect seatbelt use or correct seatbelt. The use of the first value 104, second value 106, and the ranges 107, 108, 110, 112, 114, 118, 120, 121 to identify the seatbelt use error is merely exemplary. In various implementations the ranges may be referred to as zones.

As discussed above, ALRs 22, 24 are engaged when the respective webbings 18, 20 are fully extended or close to fully extended. When the first webbing payout is greater than or equal to a third value 122, the first ratchet is engaged with the first control disc of the first ALR 22. When the second webbing payout is greater than or equal to a fourth value 123, the second ratchet is engaged with the second control disc of the second ALR 24. For this example, the third value 122, the seventh range 120, the fourth value 123, and the eighth range 121 are assumed to be the boundaries and ranges where the first and second ratchets are engaged with the respective first and second control discs.

When the first webbing payout is greater than the third value 122 and within in the seventh range 120, the BCM 50 may identify the seatbelt use error. Likewise when the second webbing payout is greater than the fourth value 123 and within the eighth range 121, the BCM 50 may identify the seatbelt use error, as the occupant should not be wearing the seatbelt 16 when the first or second ALR 22, 24 is engaged. If both the first webbing payout is greater than the third value 122 and the second webbing payout is greater than the fourth value 123, the BCM 50 may characterize this in one of two ways depending on a stored vehicle setting, as described in greater detail below.

If some child restraint seats with occupants are classified as "occupant who should be properly belted present" then the first and second webbing payouts both being greater than the respective third and fourth values 122, 123 may be treated as a correctly worn seatbelt. The seatbelt is correctly worn because a child restraint seat that properly installed using the seatbelt system would have both the first ALR 22 and the second ALR 24 engaged. In contrast, if child restraint seats with occupants are classified as "no occupant who should be properly belted present," then first and second webbing payouts both being greater than the respective third and fourth values 122, 123 may be treated as an incorrectly worn seatbelt. The seatbelt may be incorrectly worn, for example, when the occupant is an adult with first and second ALRs 22, 24 engaged.

Returning to FIG. 2, the occupant detection module 81 determines whether an occupant is present in the seat 14 based in input from the occupant detection device 58 and/or the camera 57. For example, the occupant detection module 81 may determine that an occupant is present in the seat 14 when the weight of an object in the seat 14 is greater than a predetermined weight. In another example, the occupant detection module 81 may determine that an occupant is present in the seat 14 when an object in the image captured by the camera 57 corresponds to an occupant.

The occupant detection module 81 may detect object edges or surfaces at locations in the image where the change in the brightness of the image is greater than a predetermined value. The occupant detection module 81 can determine the length of the edges and/or the distances between the edges based on a predetermined relationship between dimensions in the image and actual dimensions. The occupant detection module 81 can also determine the size of surfaces based on a predetermined relationship between dimensions in the image and actual dimensions. The occupant detection module 81 determines that the seat 14 is occupied when the size and/or shape of the profile match, or are within a predetermined range of, a standard size and/or shape of an occupant.

In various implementations, the occupant detection module 81 may determine the size of the occupant based on inputs from the occupant detection device 58 and/or the camera 57. The occupant detection module 81 may adjust the first value 104, the second value 106, and one, some, or all of the ranges 107, 108, 110, 112, 114, 118, 120, 121 based on the size of the occupant. In general, a larger occupant would require a longer first and second webbing payout. Therefore, in one example, the occupant detection module 81 may increase the first value 104 and/or the second value 106 when a larger occupant is present. Similarly, a smaller occupant would require a shorter first and second webbing payout. Therefore, in another example, the occupant detection module 81 may decrease the first value 104 and/or the second value 106 when a smaller occupant is present.

With continued reference to FIG. 2, the seat position module 82 adjusts the first value 104, the second value 106, and one, some, or all of the ranges 107, 108, 110, 112, 114, 118, 120, 121 based on inputs from one or more of the back position sensor 59, the seat position sensor 60, and the camera 57. The seat position module 82 may adjust the first value 104, the second value 106, and one, some, or all of the ranges 107, 108, 110, 112, 114, 118, 120, 121 when the first retractor 22 and the second retractor 24 are fixed with respect to a body of the vehicle and the seat 14 is adjustable with respect to the body of the vehicle. An adjustment of the position of the seat 14 changes distances between the retractors 22, 24 and the buckle 28. Therefore, expected webbing payout for correct seatbelt use also changes.

Figure 6:
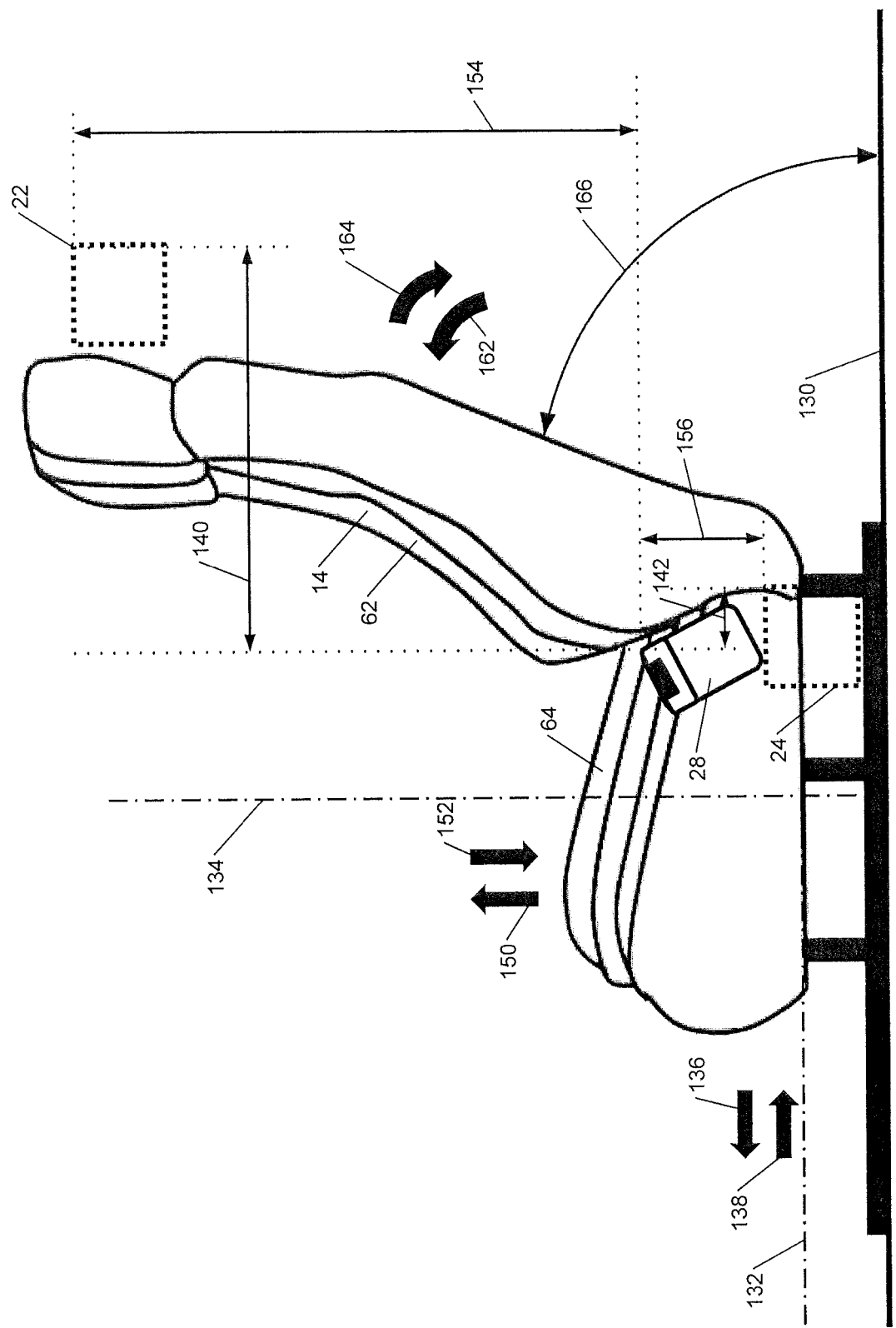
FIG. 6 is a plan view of the seat assembly of FIG. 1.

FIGS. 7A-7D illustrate example effects of various seat adjustments on correct seatbelt use ranges and are explained in more detail below. With reference to FIG. 6, the vehicle seat 14 having the seat back 62 and the seat base 64 is shown. The first and second retractor 22, 24 are fixed with respect to the vehicle body. The vehicle body includes a vehicle floor 130. The seat 14 is adjustable with respect to the vehicle body. More specifically, the seat 14 is independently translatable along a first axis 132 and a second axis 134. The seat back 62 is tiltable with respect to the seat base 64 or the vehicle floor 130.

The first axis 132 extends between a front of the vehicle and a back of the vehicle. The occupant can translate the seat 14 along the first axis 132 in a first or forward direction 136. The occupant can also translate the seat 14 along the first axis 132 in a second or backward direction 138 opposite the first direction 136.

Figure 7A:
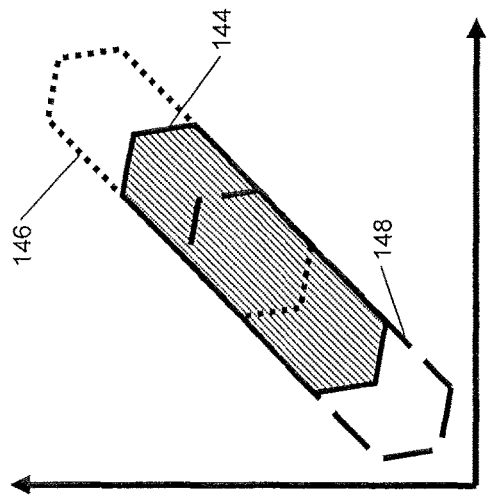
FIGS. 7A-7D are graphical representations of the seatbelt of the vehicle system of FIG. 1 showing baseline and adjusted ranges of correct seatbelt usage for various seat position adjustments.
Figure 7B:
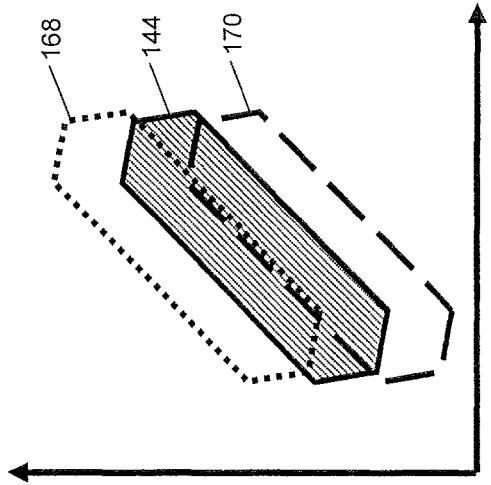

As the vehicle seat 14 translates in the first direction 136, a first distance 140 between the first retractor 22 and the buckle 28 increases. As the first distance 140 increases, the expected first webbing payout also increases. A second distance 142 between the second retractor 24 and the buckle 28 increases. As the second distance 142 increases, the expected second webbing payout also increases. The second distance 142 may be for a single seat movement approach or a combination of seat movements since some seats 14 can adjust both a front portion of the seat and a rear portion of the seat vertically in an independent manner. Also the movement of the seat 14 may be non-linear or angled with respect to horizontal and vertical axes as some seats can move at slight angles to the horizontal and vertical axes and also can have a level of rotational motion as they travel due to the mechanism design. FIG. 7A shows a baseline correct seatbelt use range 144 using a polygon having six sides. The baseline correct seatbelt use range 144 may be similar to the first range 107 of FIG. 5A. FIG. 7B shows the baseline correct seatbelt use range 144, a first adjusted range 146 representing translation of the seat 14 in the first direction 136, and a second adjusted range 148 representing translation of the seat 14 in the second direction 138.

Returning to FIG. 6, the seat 14 is also translatable along the second axis 134. The second axis 134 extends between a top of the vehicle and a bottom of the vehicle. The occupant can translate the seat 14 along the second axis 134 in a third or upward direction 150. The occupant can also translate the seat 14 in a fourth or downward direction 152 opposite the third direction 150.

Figure 7C:
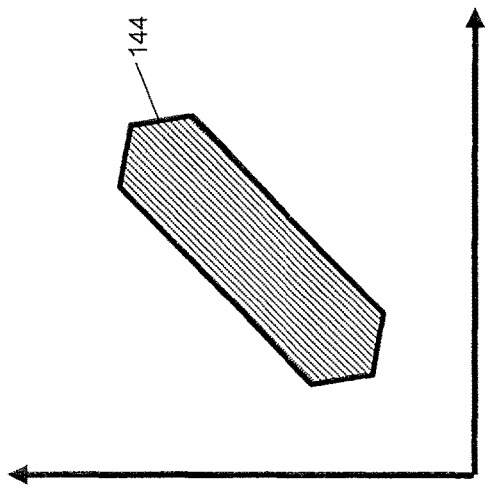

As the vehicle seat 14 translates in the third direction 150, a third distance 154 between the first retractor 22 and the buckle 28 decreases. As the third distance 154 decreases, the expected first webbing payout also decreases. A fourth distance 156 between the second retractor 24 and the buckle 28 increases. As the fourth distance 156 increases, the expected second webbing payout also increases. FIG. 7C shows the baseline correct seatbelt use range 144, a third adjusted range 158 representing translation of the seat 14 in the third direction 150, and a fourth adjusted range 160 representing translation of the seat 14 in the fourth direction 152.

Figure 7D:
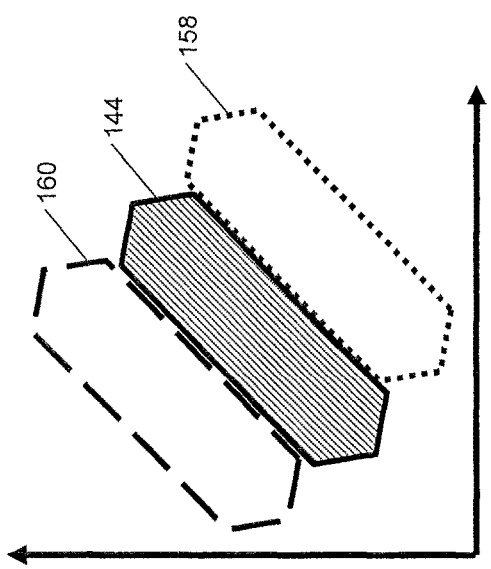

With renewed reference to FIG. 6, the seat back 62 is also tiltable with respect to the seat base 64 and the vehicle floor 130. The occupant can tilt the seat back 62 in a fifth or inclined direction 162. The occupant can also tilt the seat back 62 in a sixth or reclined direction 164. As the seat back 62 tilts in the fifth direction 162, an angle 166 between the seat back 62 and the vehicle floor 130 increases. As the angle 166 increases, the expected first webbing payout also increases. As the seat back 62 tilts in the sixth direction 164, the angle 166 decreases. As the angle 166 decreases, the expected first webbing payout also decreases. FIG. 7D shows the baseline correct seatbelt use range 144, a fifth adjusted range 168 representing tilt of the seat back 62 in the fifth direction 162, and a sixth adjusted range 170 representing tilt of the seat back 62 in the sixth direction 164.

Figure 8A:
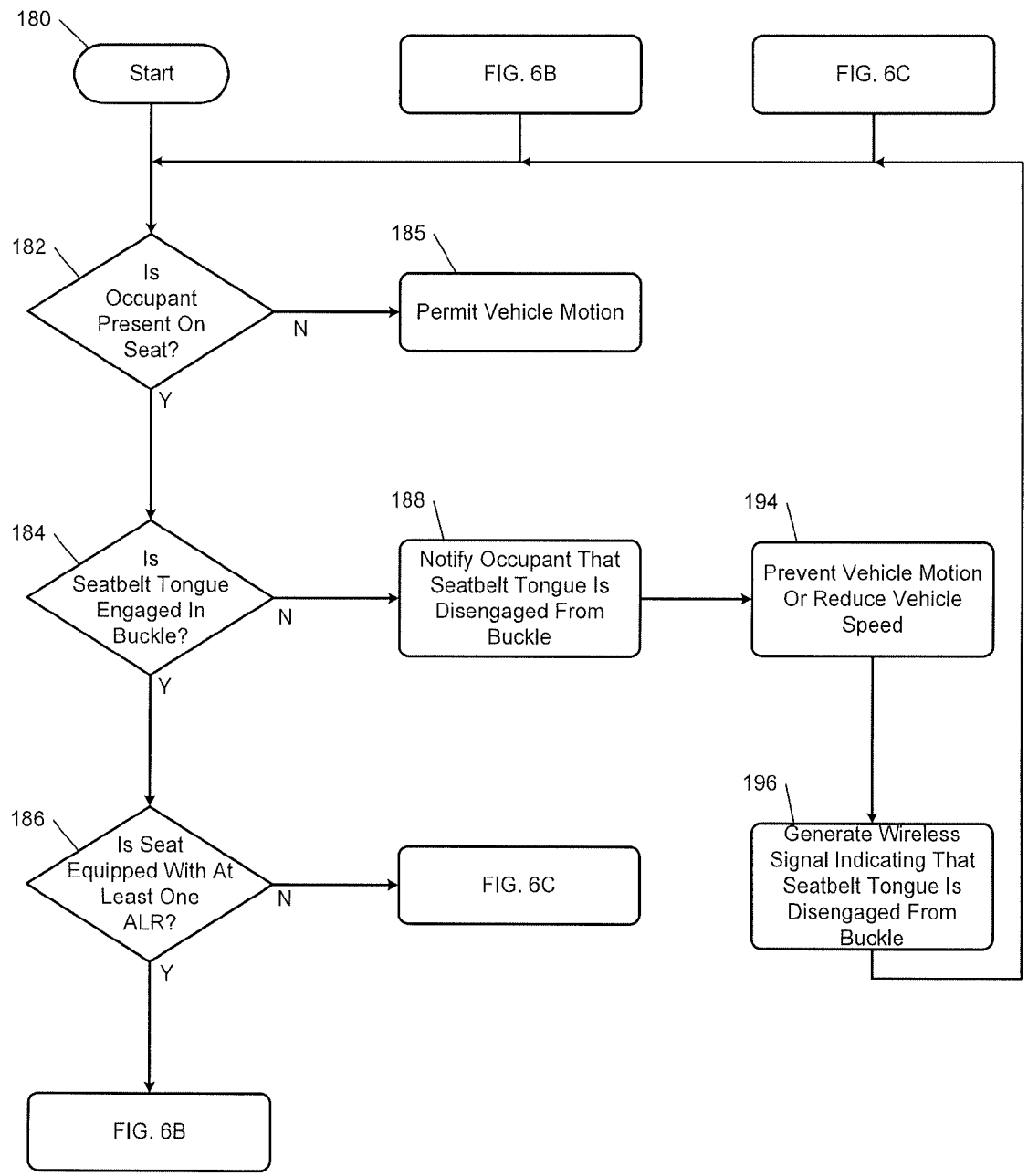
FIGS. 8A-8C are flowcharts illustrating an example vehicle control method based on conditions of a vehicle seat assembly having dual seatbelt retractors according to the principles of the present disclosure.
Figure 8B:
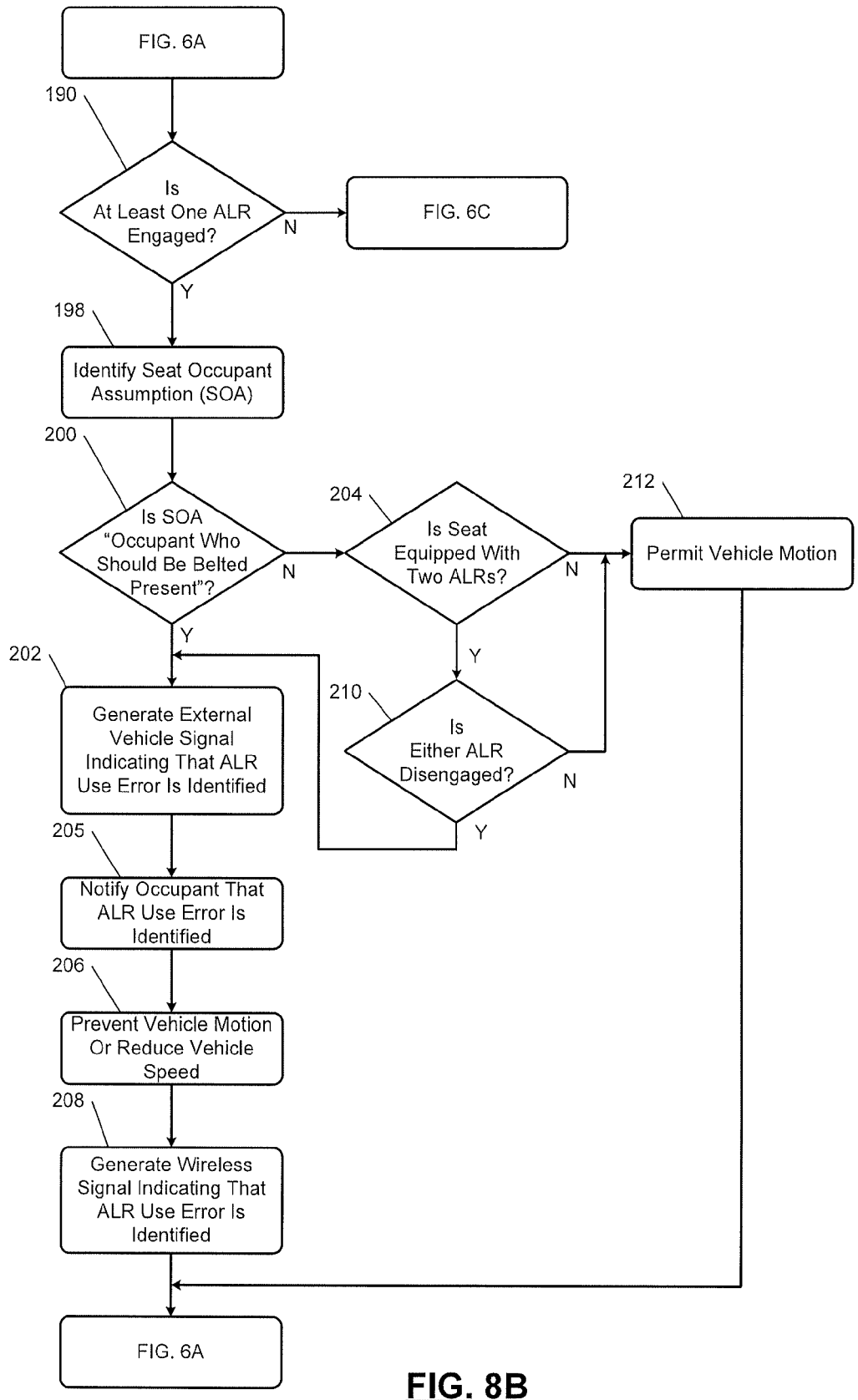
Figure 8C:
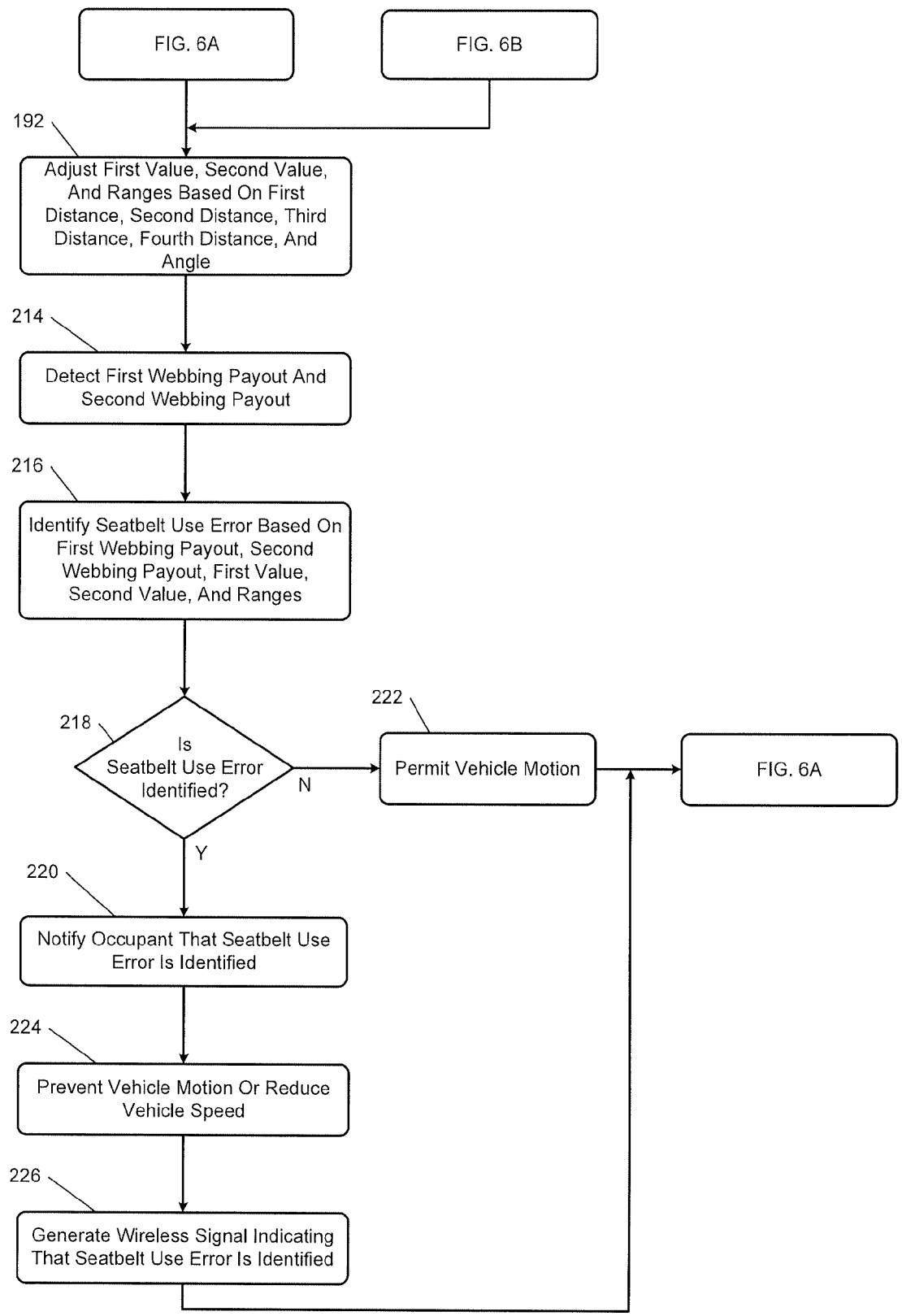

With reference to FIGS. 8A-8C, an example control method begins at 180. The method is described in the context of the vehicle system 10 shown in FIG. 1 and the modules included in the example implementation of the BCM 50 shown in FIG. 2. However, the particular modules that perform the steps of the method may be different than those mentioned below and/or the method may be implemented apart from the modules of FIG. 2.

At 182, the occupant detection module 81 determines whether the occupant (or an occupant who should be buckled) is present on the seat 14. The occupant detection module 81 determines whether the occupant is present on the seat 14 based on input from the occupant detection device 58 and/or the camera 57. If the occupant is present on the seat 14, the method continues at 184. Otherwise, the method continues at 185. At 185, the vehicle speed control module 86 permits vehicle motion. The vehicle speed control module 86 permits vehicle motion by refraining from sending a vehicle speed control instruction to one or more of the ECM 51, the TCM 52, and the EBCM 53.

At 184, the seatbelt wear condition module 80 determines whether the tongue 26 of the seatbelt 16 is engaged with the buckle 28 of the seatbelt 16. The seatbelt wear condition module 80 determines whether the tongue 26 of the seatbelt 16 is engaged with the buckle 28 of the seatbelt 16 based on input from the buckle sensor 32. Alternatively, the determination of whether the tongue 26 of the seatbelt 16 is engaged with the buckle 28 may be made by one or both of the webbing sensors 33, 34 as the seatbelt 16 may be classified as unbuckled if the seatbelt webbing payout is short. For example, the seatbelt 16 may be classified as unbuckled if the first webbing payout is less than the first value 104 and the second webbing payout is less than the second value 106, both the first and second webbing payouts are less than the first and second values 104, 106, or the first and second webbing payout fall within the second range 108. If the tongue 26 is engaged with the buckle 28, the method continues at 186. Otherwise, the method continues at 188.

At 186, the seatbelt wear condition module determines whether the seat 14 is equipped with at least one ALR (e.g., at least one of the first retractor 22 and the second retractor 24 is an ALR). If the seat 14 is equipped with at least one ALR, the method continues at 190 (FIG. 8B), otherwise the method continues at 192 (FIG. 8C).

At 188, the UID control module 88 controls the internal UID 54 to notify the occupant that the tongue 26 of the seatbelt 16 is disengaged from the buckle 28. The UID 54 notifies the occupant that the tongue 26 is disengaged from the buckle 28 by generating a visual message (e.g., text, a light, and/or a symbol), an audible message (e.g., a chime), and/or a tactile message (e.g., a vibration) indicating that the tongue 26 is disengaged from the buckle 28. The method continues at 194.

At 194, the vehicle speed control module 86 prevents vehicle motion or reduces vehicle speed, including stopping the vehicle. The vehicle speed control module 86 prevents vehicle motion or reduces vehicle speed by sending a vehicle speed control instruction to one or more of the ECM 51, the TCM 52, and the EBCM 53. The vehicle speed control module 86 prevents vehicle motion when the vehicle is stationary. The vehicle speed control module 86 reduces vehicle speed when the vehicle is in motion. The vehicle speed control module 86 may prevent vehicle motion or reduce the vehicle speed to a predetermined safe speed (e.g., zero) until the tongue 26 of the seatbelt 16 is engaged with the buckle 28. If the vehicle speed control module 86 reduces the vehicle speed to zero, BCM 50 may also control the vehicle to seek a safe location to park. The method continues at 196.

At 196, the UID control module 88 transmits the wireless signal 55 to the satellite communication network 56 to notify a third party that the tongue 26 is disengaged from the buckle 28. The method then returns to 182.

The actions of the vehicle speed control module 86 at step 194 and the UID control module 88 at steps 188 and 196 can occur simultaneously or in different orders with respect to each other based on the situation. For instance, if the vehicle is stationary, the vehicle speed control module 86 could simultaneously prevent the vehicle from moving and the UID control module 88 could display a warning and sound a chime a few seconds later. As another example, if the vehicle is moving, the UID control module 88 could display a warning and sound a chime. If this is not heeded by the occupant in a certain amount of time, the vehicle speed control module 86 could reduce the speed of the vehicle or park the vehicle.

At 190 (FIG. 8B), the ALR use module 84 determines whether at least one ALR is engaged. The ALR use module 84 determines whether at least one ALR is engaged based on input from the first ratchet sensor 66 and the second ratchet sensor 68. If at least one ALR is engaged, the method continues at 198. Otherwise, the method continues at 192.

At 198, the ALR use module 84 identifies a seat occupant assumption (SOA). The ALR use module 84 identifies the SOA based on a vehicle setting, which may be stored in the ALR use module 84 when, for example, the vehicle is assembled. The SOA is either "no occupant who should be belted present" or "occupant who should be belted present." The ALR use module 84 uses the SOA to determine how to proceed when one or more ALRs are engaged. More specifically, if the SOA is "occupant who should be belted present," then neither of the ALRs should be engaged. If the SOA is "no occupant who should be belted present," then both of the ALRs should be engaged because the occupant may be a child restraint seat attached to the vehicle using latch anchors or the seatbelt and if the seatbelt is buckled (i.e., the tongue 26 is engaged in the buckled 28), both ALRs should be engaged. The method continues at 200. At 200, the ALR use module 84 determines whether the SOA is "occupant who should be belted present." If the SOA is "occupant who should be belted present," the method continues at 202. Otherwise, the method continues at 204.

At 202, the UID control module 88 controls the external UID 70 indicating that the ALR use error is identified. The UID control module 88 causes the external UID 70 to generate a message that is visible outside the vehicle (e.g., to passersby). The external UID 70 may generate a visual message (e.g., text, a light, and/or a symbol) and/or an audible message (e.g., a chime) indicating that the ALR use error is present. The method continues at 205.

At 205, the UID control module 88 controls the internal UID 54 to notify the occupant that the ALR use error is identified. The internal UID 54 notifies the occupant of the ALR use error by generating a visual message (e.g., text, a light, and/or a symbol), an audible message (e.g., a chime), and/or a tactile message (e.g., a vibration) indicating that the ALR use error is present. The method continues at 206.

At 206, the vehicle speed control module 86 prevents vehicle motion or reduces vehicle speed. The vehicle speed control module 86 prevents vehicle motion or reduces vehicle speed by sending a vehicle speed control instruction to one or more of the ECM 51, the TCM 52, and the EBCM 53. The vehicle speed control module 86 prevents vehicle motion when the vehicle is stationary. The vehicle speed control module 86 reduces vehicle speed when the vehicle is in motion. The vehicle speed control module 86 may prevent vehicle motion or reduce the vehicle speed to a predetermined safe speed (e.g., zero) until the ALR use error is no longer present. The method continues at 208.

At 208, the UID control module 88 transmits the wireless signal 55 to the satellite communication network 56 to notify a third party that the ALR use error is present. As discussed above, the actions of the vehicle speed control module 86 and the UID control module 88 may occur simultaneously or in different orders to with respect to each other based on the situation. The method returns to 182 (FIG. 8A).

At 204, the ALR use module 84 determines whether the seat 14 is equipped with two ALRs (e.g., the first and second retractors 22, 24 are first and second ALRs). If the seat 14 is equipped with two ALRs, the method continues at 210. Otherwise, the method continues at 212. At 210, the ALR use module 84 determines whether either of the first and second ALRs is disengaged. If either one of the first ALR or the second ALR is disengaged, the method continues at 202. Otherwise, the method continues at 212. At 212, the vehicle speed control module 86 permits vehicle motion. The vehicle speed control module 86 permits vehicle motion by refraining from sending a vehicle speed control instruction to one or more of the ECM 51, the TCM 52, and the EBCM 53.

At 192 (FIG. 8C), the seat position module 82 adjusts the first value 104, the second value 106, and/or one or more of the ranges 107, 108, 110, 112, 114, 118, 120, 121 based on the first distance 140, the second distance 142, the third distance 154, the fourth distance 156, and/or the angle 166 as described about with reference to FIGS. 6 and 7A-7D. The first distance 140, the second distance 142, the third distance 154, the fourth distance 156, and the angle 166 may be determined based on inputs from the back position sensor 59, the seat position sensor 60, and/or the camera 57. In alternate embodiments, the vehicle seats 14 may have an automatic adjustment feature including memory of seat position (e.g., coordinates). The method continues at 214. At 214, the seatbelt wear condition module 80 detects the first webbing payout and the second webbing payout. The method continues at 216.

At 216, the seatbelt wear condition module 80 identifies the seatbelt use error based on the first webbing payout, the second webbing payout, the first value 104, the second value 106, and/or one or more of the ranges 107, 108, 110, 112, 114, 118, 120, 121. In one example, the seatbelt wear condition module 80 identifies the seatbelt use error when the first webbing payout is less than the first value 104, the second webbing payout is less than the second value 106, or both the first webbing payout is less than the first value 104 and the second webbing payout is less than the second value 106. In another example, the seatbelt wear condition module 80 identifies the seatbelt use error when the first webbing payout and the second webbing payout are outside of the first range 107. The method continues at 218.

At 218, the seatbelt wear condition module 80 determines whether the seatbelt use error is identified. If the seatbelt use error is identified, the method continues at 220. Otherwise, the method continues at 222. At 222, the vehicle speed control module 86 permits vehicle motion. The vehicle speed control module 86 permits vehicle motion by refraining from sending a vehicle speed control instruction to one or more of the ECM 51, the TCM 52, and the EBCM 53. The method continues at 182 (FIG. 8A).

At 220, the UID control module 88 controls the internal UID 54 to notify the occupant that the seatbelt use error is identified. The internal UID 54 notifies the occupant by generating a visual message (e.g., text, a light, and/or a symbol), an audible message (e.g., a chime), and/or a tactile message (e.g., a vibration) indicating that the seatbelt use error is present. The method continues at 224.

At 224, the vehicle speed control module 86 prevents vehicle motion or reduces vehicle speed. The vehicle speed control module 86 prevents vehicle motion or reduces vehicle speed by sending a vehicle speed control instruction to one or more of the ECM 51, the TCM 52, and the EBCM 53. The vehicle speed control module 86 prevents vehicle motion when the vehicle is stationary. The vehicle speed control module 86 reduces vehicle speed when the vehicle is in motion. The vehicle speed control module 86 may prevent vehicle motion or reduce the vehicle speed to a predetermined safe speed or park the vehicle until the seatbelt use error is no longer present. The method continues at 226.

At 226, the UID control module 88 transmits the wireless signal 55 to the satellite communication network 56 to notify a third party that the seatbelt use error is present. As discussed above, the actions of the vehicle speed control module 86 and the UID control module 88 may occur simultaneously or in different orders to with respect to each other based on the situation. The method returns to 182 (FIG. 8A). As discussed above, the actions of the vehicle speed control module 86 and the UID control module 88 may occur simultaneously or in different orders to with respect to each other based on the situation.

Figure 9:
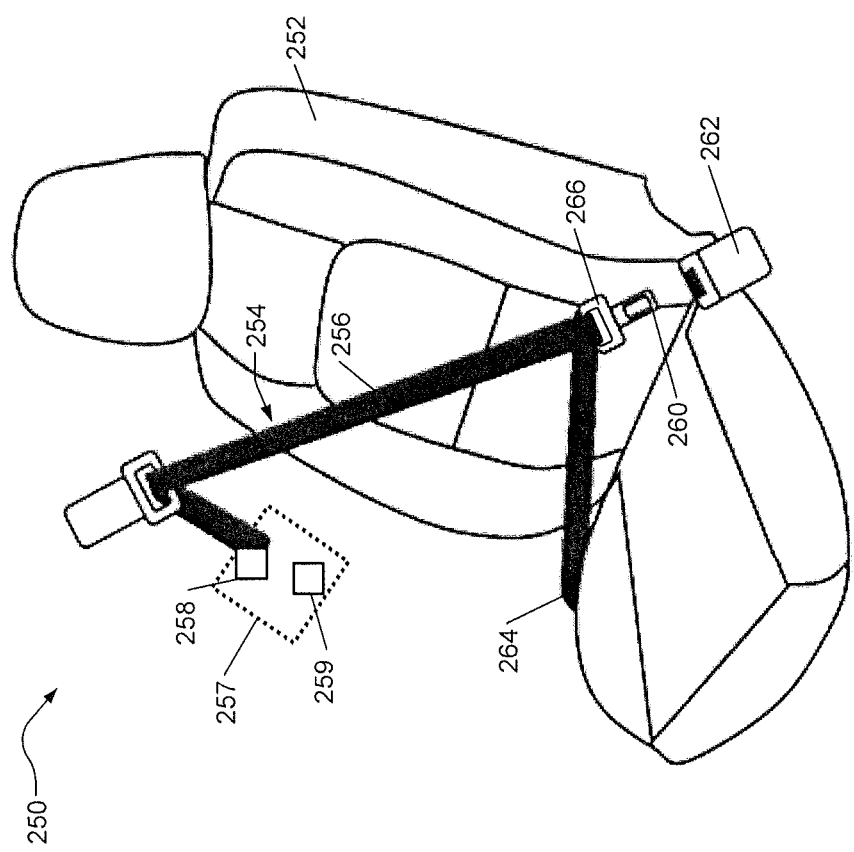
FIG. 9 is a perspective view of an example seat assembly having a single seatbelt retractor according to the principles of the present disclosure.

Some vehicle systems may include seat assemblies having a single seatbelt retractor and webbing sensor instead of the dual retractor and webbing sensor system described above. Referring to FIG. 9, a vehicle seat assembly 250 according to certain aspects of the present disclosure is provided. Aside from the use of a single retractor system instead of a dual retractor system, a vehicle system including the seat assembly 250 is similar to the vehicle system 10 of FIG. 1.

The vehicle seat assembly 250 includes a seat 252 that may be similar to the seat 14 of FIG. 1 and a seatbelt 254. The seatbelt 254 includes webbing 256 that is dispensed from a retractor 257 similar to the first retractor 22 of FIG. 1. Although the retractor 257 is shown as mounted to the vehicle structure, it may alternatively be mounted to the seat 252 (not shown). The seatbelt 254 also includes a tongue 260 that engages a buckle interface or buckle 262. The tongue 260 and buckle 262 may be similar to the tongue 26 and buckle 28 of FIG. 1, respectively.

Unlike the seatbelt 16 of FIG. 1, the seatbelt 254 is only dispensed from the single retractor 257. The retractor 257 may be located near a shoulder position. The seatbelt 254 may include a lower anchor point 264 fixed to a first side of the seat 252 or the vehicle body (not shown). The seatbelt webbing 256 continuously extends from the lower anchor point 264, across the seat 252 and through a loop 266 attached to the tongue 260, and into the retractor 257. As an occupant extracts the seatbelt webbing 256 from the retractor 257 and pulls the seatbelt around himself or herself, the seatbelt webbing 256 slides through the loop 266 so that the seatbelt webbing 256 is positioned around the occupant's lap and torso. In various implementations, the seatbelt 254 may be routed through one or more guide loops (not shown). In various implementations, a portion of the webbing 256 may be routed under the trim surfaces so that they are not visible to the occupant.

In an alternative embodiment, the retractor 257 may be similar to the second retractor 24 of FIG. 1. Thus, the retractor 257 may be located near a lap position rather than the shoulder position. Instead of the lower anchor point 266, the seatbelt 254 may include an upper anchor point disposed near the shoulder position.

The retractor 257 includes a webbing sensor 258 and a ratchet sensor 259, similar to the first webbing sensor 33 and the first ratchet sensor 66 of FIG. 1, respectively. The webbing sensor 258 measures a total length of seatbelt webbing 256 extracted from the retractor 257 (i.e., a webbing payout length). Thus, unlike the vehicle system 10 of FIG. 1, the seat assembly 250 does not include separate sensors for shoulder webbing and lap webbing. Similar to the vehicle system of FIG. 1, the BCM 50 uses the webbing payout length as detected by the webbing sensor 258 to identify a seatbelt use error.

Figure 10:
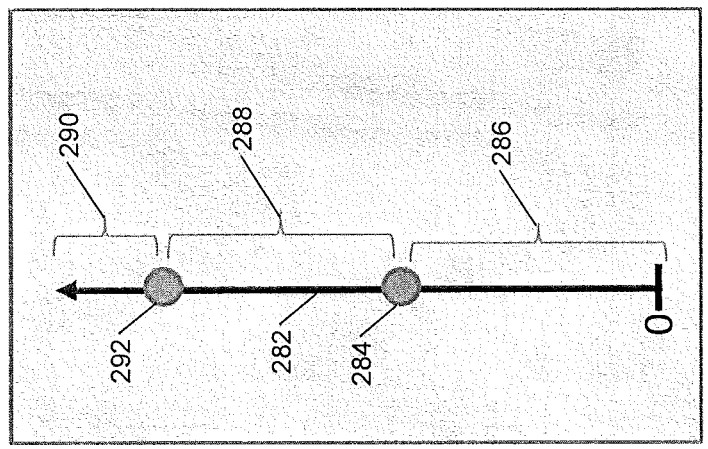
FIG. 10 is a graphical representation of seatbelt usage of the vehicle system of FIG. 9 showing a webbing payout and ranges of correct and incorrect seatbelt usage based on the webbing payout.

Referring to FIG. 10, webbing payout is shown at 282. The BCM 50 identifies the seatbelt use error when the webbing payout length is less than a first value 284 and the tongue 260 of the seatbelt 254 is engaged in the buckle 262. The BCM 50 may also identify the seatbelt use error when the webbing payout length is less than the first value 284, the tongue 260 of the seatbelt 254 is engaged in the buckle, and the occupant is present in the seat 252. Thus, an incorrect seatbelt use range 286 is defined at webbing payouts greater than or equal to zero and less than the first value 284. A shorter webbing payout may indicate, for example, that the occupant is sitting on the seatbelt webbing 256.

A correct seatbelt use range 288 may be defined at a webbing payout greater than or equal to the first predetermined value 284. A longer webbing payout may indicate that the occupant is correctly wearing the seatbelt 254. An additional incorrect seatbelt usage range 290 may be defined when the webbing payout is greater than a second value 292. This may indicate that the webbing payout is too long for the occupant. The usage of the second predetermined value 292 modifies the correct seatbelt usage range to fall between the first value 284 and the second value 292, as shown. When the retractor 257 is an ALR, a second value 292 may correspond to the webbing payout at which the ALR is engaged. Thus, the incorrect seatbelt usage range 290 may define an ALR engagement range.

Figure 11A:
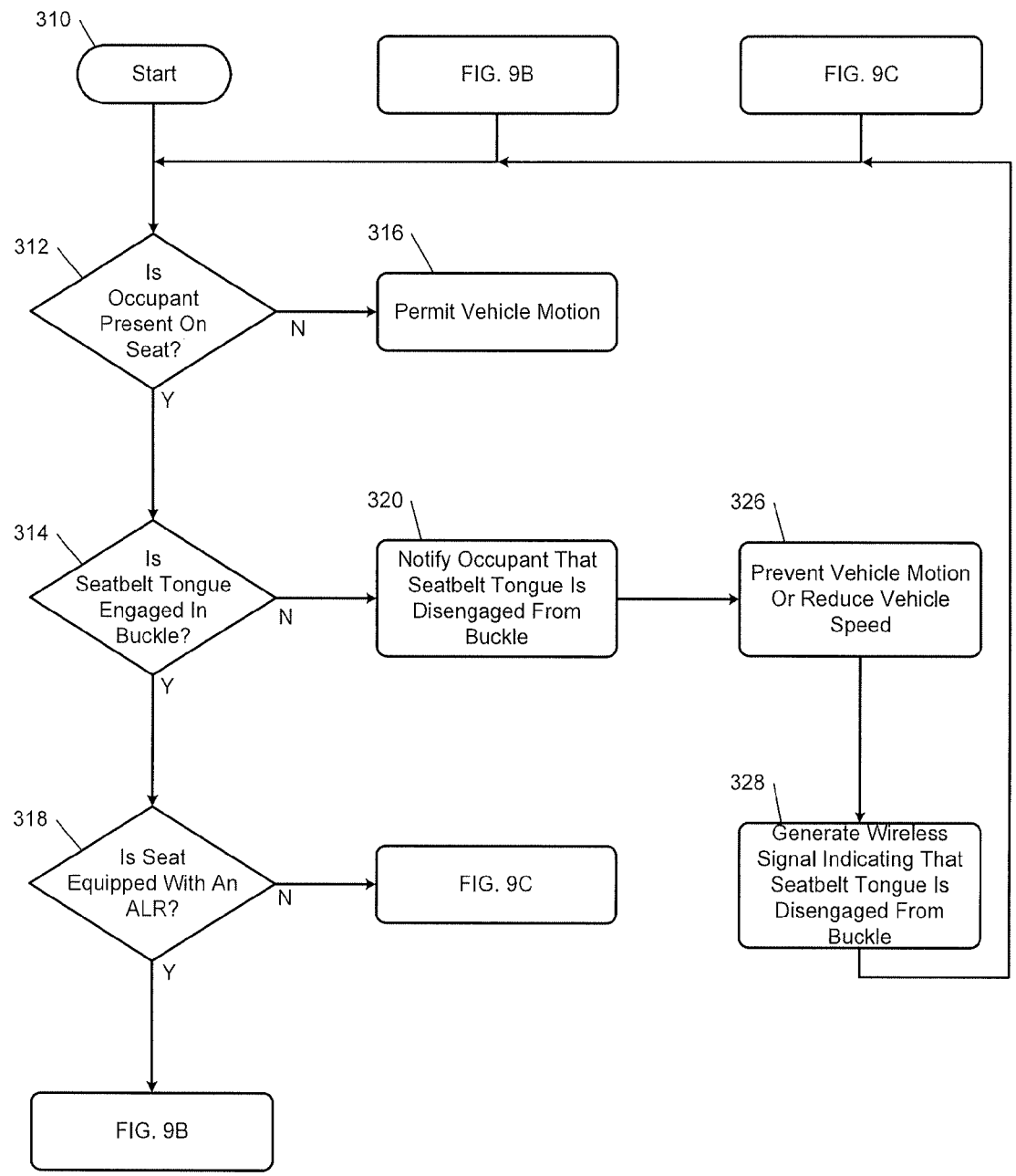
FIGS. 11A-11C are flowcharts illustrating an example vehicle control method based on conditions of a vehicle seat assembly having a single seatbelt retractor according to the principles of the present disclosure.
Figure 11B:
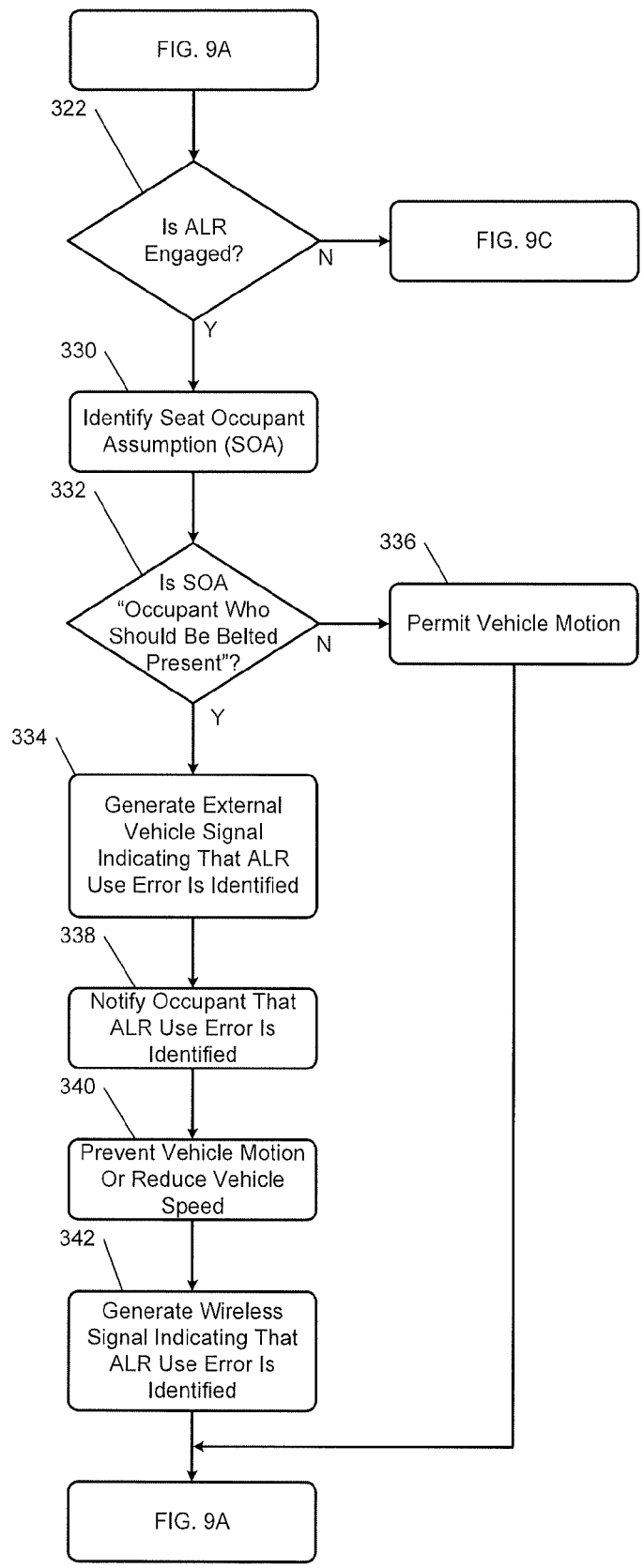
Figure 11C:
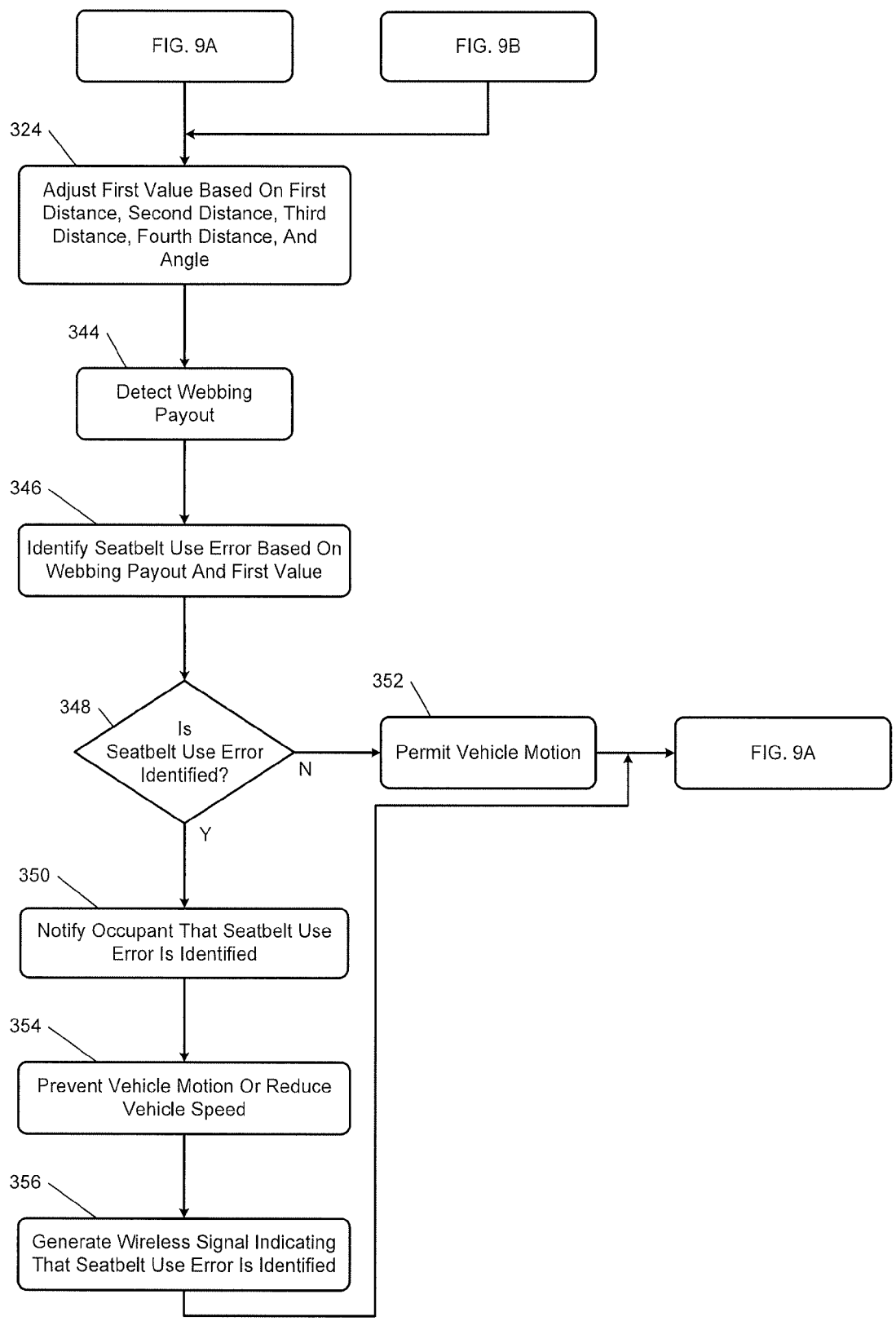

With reference to FIGS. 11A-11C, an example control method begins at 310. The method is described in the context of the vehicle system having the seat assembly 250 shown in FIG. 9 and the modules included in the example implementation of the BCM 50 shown in FIG. 2. However, the particular modules that perform the steps of the method may be different than those mentioned below and/or the method may be implemented apart from the modules of FIG. 2.

At 312, the occupant detection module 81 determines whether the occupant is present on the seat 252. The occupant detection module 81 determines whether the occupant is present on the seat 252 based on input from an occupant detection device similar to the occupant detection device 58 of FIG. 1 and/or a camera similar to the camera 57 of FIG. 1. If the occupant is present on the seat 252, the method continues at 314. Otherwise, the method continues at 316. At 316, the vehicle speed control module 86 permits vehicle motion. The vehicle speed control module 86 permits vehicle motion by refraining from sending a vehicle speed control instruction to one or more of the ECM 51, the TCM 52, and the EBCM 53.

At 314, the seatbelt wear condition module 80 determines whether the tongue 260 of the seatbelt 254 is engaged with the buckle 262 of the seatbelt 254. The seatbelt wear condition module 80 determines whether the tongue 260 of the seatbelt 254 is engaged with the buckle 262 of the seatbelt 254 based on input from a buckle sensor. Alternatively, the determination of whether the tongue 260 of the seatbelt 254 is engaged with the buckle 262 may be made by the webbing payout sensor as the seatbelt 254 may be classified as unbuckled if a short webbing payout is present. If the tongue 260 is engaged with the buckle 262, the method continues at 318. Otherwise, the method continues at 320.

At 318, the seatbelt wear condition module 80 determines whether the seat 252 is equipped with an ALR. If the seat 252 is equipped with an ALR, the method continues at 322 (FIG. 11B), otherwise the method continues at 324 (FIG. 11C).

At 320, the UID control module 88 controls an internal UID (similar to the internal UID 54 of FIG. 1) to notify the occupant that the tongue 260 of the seatbelt 254 is disengaged from the buckle 262. The internal UID notifies the occupant by generating a visual message (e.g., text, a light, and/or a symbol), an audible message (e.g., a chime), and/or a tactile message (e.g., a vibration) indicating that the tongue 26 is disengaged from the buckle 28. The method continues at 326.

At 326, the vehicle speed control module 86 prevents vehicle motion or reduces vehicle speed, including stopping the vehicle. The vehicle speed control module 86 prevents vehicle motion or reduces vehicle speed by sending a vehicle speed control instruction to one or more of the ECM 51, the TCM 52, and the EBCM 53. The vehicle speed control module 86 prevents vehicle motion when the vehicle is stationary. The vehicle speed control module 86 reduces vehicle speed when the vehicle is in motion. The vehicle speed control module 86 may prevent vehicle motion or reduce the vehicle speed to a predetermined safe speed (e.g., zero) until the tongue 260 of the seatbelt 254 is engaged with the buckle 262. If the vehicle speed control module 86 reduces the vehicle speed to zero, the BCM 50 may control the vehicle to seek a safe location to park. The method continues at 328.

At 328, the UID control module 88 transmits the wireless signal to a satellite communication network to notify a third party that the tongue 260 of the seatbelt 254 is disengaged from the buckle 262. As discussed above with respect to FIGS. 8A-8C, the actions of the vehicle speed control module 86 and the UID control module 88 may occur simultaneously or in different orders to with respect to each other based on the situation. The method returns to 312.

At 322 (FIG. 11B), the ALR use module 84 determines whether the ALR is engaged. The ALR use module 84 determines whether the ALR is engaged based on input from the ratchet sensor 259. If the ALR is engaged, the method continues at 330. Otherwise, the method continues at 324 (FIG. 11C).

At 330, the ALR use module 84 identifies a SOA. The ALR use module 84 identifies the SOA based on a vehicle setting, which may be stored in the ALR use module 84 when, for example, the vehicle is assembled. The SOA is either "no occupant who should be belted present" or "occupant who should be belted present." The ALR use module 84 uses the SOA to determine how to proceed when one or more ALRs are engaged. More specifically, if the SOA is "occupant who should be belted present," ALR should not be engaged. If the SOA is "no occupant who should be belted present," then the ALR should be engaged. The method continues at 332.

At 332, the ALR use module 84 determines whether the SOA is "occupant who should be belted present." If the SOA is "occupant who should be belted present," the method continues at 334. Otherwise, the method continues at 336. At 336, the vehicle speed control module 86 permits vehicle motion. The vehicle speed control module 86 permits vehicle motion by refraining from sending a vehicle speed control instruction to one or more of the ECM 51, the TCM 52, and the EBCM 53.

At 334, the UID control module 88 controls an external UID (similar to the external UID 70 of FIG. 1) indicating that the ALR use error is identified. The UID control module 88 controls the external UID to generate a message that is visible outside the vehicle (e.g., to passersby). The external UID may generate a visual message (e.g., text, a light, and/or a symbol) or an audible message (e.g., a chime) indicating that the ALR use error is present. The method continues at 338.

At 338, the UID control module 88 controls the internal UID to notify the occupant that the ALR use error is identified. The internal UID 54 notifies the occupant by generating a visual message (e.g., text, a light, and/or a symbol), an audible message (e.g., a chime), and/or a tactile message (e.g., a vibration) indicating that the ALR use error is present. The method continues at 340.

At 340, the vehicle speed control module 86 prevents vehicle motion or reduces vehicle speed. The vehicle speed control module 86 prevents vehicle motion or reduces vehicle speed by sending a vehicle speed control instruction to one or more of the ECM 51, the TCM 52, and the EBCM 53. The vehicle speed control module 86 prevents vehicle motion when the vehicle is stationary. The vehicle speed control module 86 reduces vehicle speed when the vehicle is in motion. The vehicle speed control module 86 may prevent vehicle motion or reduce the vehicle speed to a predetermined safe speed until the ALR use error is no longer present. The method continues at 342.

At 342, the UID control module 88 transmits a wireless signal to the satellite communication network to notify a third party that the ALR use error is present. As discussed above with respect to FIGS. 8A-8C, the actions of the vehicle speed control module 86 and the UID control module 88 may occur simultaneously or in different orders to with respect to each other based on the situation. The method returns to 312 (FIG. 11A).

At 324 (FIG. 11C), the seat position module 82 adjusts the first value 284 based on a first distance (similar to the first distance 140 of FIG. 6), a second distance (similar to the second distance 142 of FIG. 6), a third distance (similar to the third distance 154 of FIG. 6), a fourth distance (similar to the fourth distance 156 of FIG. 6), and/or an angle (similar to the angle 166 of FIG. 6). The first distance, the second distance, the third distance, the fourth distance, and the angle may be determined based on inputs from a back position sensor, a seat position sensor, and/or the camera. The back position sensor and the seat position sensor may be similar to the back position sensor 59 and the seat position sensor 60 of FIG. 1, respectively. The method continues at 344. At 344, the seatbelt wear condition module 80 detects the webbing payout. The method continues at 346.

At 346, the seatbelt wear condition module 80 identifies a seatbelt use error based on the webbing payout and the first value 284. In one example, the seatbelt wear condition module 80 identifies the seatbelt use error when the webbing payout is less than the first value 284. The method continues at 348.

At 348, the seatbelt wear condition module 80 determines whether the seatbelt use error is identified. If the seatbelt use error is identified, the method continues at 350. Otherwise, the method continues at 352. At 352, the vehicle speed control module 86 permits vehicle motion. The vehicle speed control module 86 permits vehicle motion by refraining from sending a vehicle speed control instruction to one or more of the ECM 51, the TCM 52, and the EBCM 53. The method returns to 312 (FIG. 11A).

At 350, the UID control module 88 controls the internal UID to notify the occupant that the seatbelt use error is identified. The internal UID 54 notifies the occupant by generating a visual message (e.g., text, a light, and/or a symbol), an audible message (e.g., a chime), and/or a tactile message (e.g., a vibration) indicating that the seatbelt use error is present. The method continues at 354.

At 354, the vehicle speed control module 86 prevents vehicle motion or reduces vehicle speed. The vehicle speed control module 86 prevents vehicle motion or reduces vehicle speed by sending a vehicle speed control instruction to one or more of the ECM 51, the TCM 52, and the EBCM 53. The vehicle speed control module 86 prevents vehicle motion when the vehicle is stationary. The vehicle speed control module 86 reduces vehicle speed when the vehicle is in motion. The vehicle speed control module 86 may prevent vehicle motion or reduce the vehicle speed to a predetermined safe speed or park the vehicle until the seatbelt use error is no longer present. The method continues at 356.

At 356, the UID control module 88 transmits a wireless signal to the satellite communication network to notify a third party that the seatbelt use error is present. As discussed above with respect to FIGS. 8A-8C, the actions of the vehicle speed control module 86 and the UID control module 88 may occur simultaneously or in different orders to with respect to each other based on the situation. The method returns to 312 (FIG. 11A).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a first webbing payout sensor configured to detect a first webbing payout of a seatbelt associated with a seat of a vehicle, wherein the first webbing payout is a first length of webbing of the seatbelt dispensed from a first retractor of the seatbelt; and
   a seatbelt wear condition module configured to identify whether the seatbelt is worn correctly when the first webbing payout is less than a first value and a tongue of the seatbelt is engaged in a buckle of the seatbelt, wherein:
the buckle is fixed to one of the seat and a body of the vehicle;
a lower anchor of the seatbelt is fixed to one of the seat and the body;
the first retractor is fixed with respect to the body and a floor of the vehicle;
the seat is adjustable with respect to the first retractor along an axis;
a back of the seat is tiltable with respect to the floor; and
the system further includes a seat position module configured to adjust the first value based on at least one of:
a distance between the first retractor and the buckle, the distance being measured in a direction parallel to the axis; and
an angle between the back of the seat and the floor.

2. The system of claim 1 further comprising a camera, wherein the seat position module is configured to identify at least one of (i) the distance between the first retractor and the buckle and (ii) the angle between the back of the seat and the floor based on input from the camera.

3. A system comprising:
a first webbing payout sensor configured to detect a first webbing payout of a seatbelt associated with a seat of a vehicle, wherein the first webbing payout is a first length of a shoulder webbing of the seatbelt dispensed from a first retractor of the seatbelt;
a second webbing payout sensor configured to detect a second webbing payout of the seatbelt associated with the seat, wherein the second webbing payout is a second length of a lap webbing of the seatbelt dispensed from a second retractor of the seatbelt; and
a seatbelt wear condition module configured to identify whether the seatbelt is worn correctly based on the first webbing payout and the second webbing payout.

4. The system of claim 3 wherein the shoulder webbing and the lap webbing are both fixed to a single tongue.

5. The system of claim 4 wherein the tongue is sewn into the shoulder webbing and the lap webbing.

6. The system of claim 4 wherein the tongue is sewn into the lap webbing, and the shoulder webbing is mechanically fastened to the tongue.

7. The system of claim 3 wherein the seatbelt wear condition module is configured to:
identify that the seatbelt is worn incorrectly when the first webbing payout is less than a first value and a tongue of the seatbelt is engaged in a buckle of the seatbelt; and
identify that the seatbelt is worn incorrectly when the second webbing payout is less than a second value and the tongue of the seatbelt is engaged in the buckle of the seatbelt.

8. The system of claim 3 wherein the seatbelt wear condition module is configured to identify that the seatbelt is worn correctly based on whether the first webbing payout and the second webbing payout are within in a range.

9. The system of claim 8 wherein the range is defined by a two-dimensional polygon that is a function of the first webbing payout and the second webbing payout.

10. The system of claim 8 wherein the seatbelt wear condition module is configured to identify that the seatbelt is worn incorrectly when:
a tongue of the seatbelt is engaged in a buckle of the seatbelt; and
the first webbing payout and the second webbing payout are outside of the range.

11. The system of claim 10 wherein:
the buckle is fixed to one of the seat and a body of the vehicle;
the first retractor is fixed with respect to the body;
the second retractor is fixed with respect to the body;
the seat is adjustable with respect to the first retractor and the second retractor along an axis; and
the system further includes a seat position module configured to adjust the range based a first distance between the first retractor and the buckle and a second distance between the second retractor and the buckle, each of the first distance and the second distance being measured in a direction parallel to the axis.

12. The system of claim 10 wherein:
the buckle is fixed to one of the seat and a body of the vehicle;
the first retractor is fixed with respect to a floor of the vehicle;
the second retractor is fixed with respect to the floor;
a back of the seat is tiltable with respect to the floor; and
the system further includes a seat position module configured to adjust the range based on an angle between the back of the seat and the floor.

13. The system of claim 3 further comprising a vehicle speed control module configured to control a speed of the vehicle to at least one of decrease the speed of the vehicle and prevent the vehicle from moving when the seatbelt is worn incorrectly.

14. The system of claim 3 further comprising a user interface device (UID) control module configured to control a user interface device to generate at least one of an audible message, a tactile message, and a visual message indicating whether the seatbelt is worn correctly.

* * * * *